US007530599B2

(12) United States Patent
Williams et al.

(10) Patent No.: US 7,530,599 B2
(45) Date of Patent: May 12, 2009

(54) FLEXIBLE HOUSING FOR AN AIRBAG MODULE

(75) Inventors: Jeffrey D. Williams, Roy, UT (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 513 days.

(21) Appl. No.: 11/282,336

(22) Filed: Nov. 18, 2005

(65) Prior Publication Data
US 2007/0007753 A1    Jan. 11, 2007

Related U.S. Application Data

(63) Continuation-in-part of application No. 11/174,956, filed on Jul. 5, 2005.

(51) Int. Cl.
B60R 21/20  (2006.01)
(52) U.S. Cl. .................... 280/782.2; 280/732
(58) Field of Classification Search .......... 280/728.1, 280/728.2, 732; 248/95, 99–101; 403/179, 403/291, 404, 364, 319, 316, 331, 329, 353, 403/270
See application file for complete search history.

(56) References Cited

U.S. PATENT DOCUMENTS

| 5,393,090 | A | | 2/1995 | Shepherd et al. |
| 5,454,588 | A | * | 10/1995 | Rose ................. 280/728.2 |
| 5,540,460 | A | | 7/1996 | Wipasuramonton |
| 5,676,392 | A | * | 10/1997 | Lunt et al. ............ 280/728.2 |
| 5,697,636 | A | * | 12/1997 | Orme et al. ........... 280/728.2 |
| 5,749,597 | A | | 5/1998 | Saderholm |
| 5,806,879 | A | | 9/1998 | Hamada et al. |
| 6,325,415 | B1 | | 12/2001 | Zelinski et al. |
| 2002/0149177 | A1 | | 10/2002 | Rose et al. |
| 2005/0225059 | A1 | | 10/2005 | Lewis et al. |

FOREIGN PATENT DOCUMENTS

| DE | 41 37 691 | | 11/1992 |
| DE | 19 705 829 | | 5/1998 |
| DE | 199 36 353 A1 | * | 2/2001 |
| EP | 0 861 760 | | 9/1998 |
| EP | 1 209 044 A1 | | 5/2002 |
| JP | 11-34782 A | * | 7/1997 |
| WO | 99/29539 | | 6/1999 |

* cited by examiner

*Primary Examiner*—Ruth Ilan
(74) *Attorney, Agent, or Firm*—Sally J Brown; Pauley Petersen & Erickson

(57) ABSTRACT

A housing for an airbag module that contains an inflatable airbag cushion in a compacted configuration before being inflated by inflation gas supplied by an inflator device. The housing includes a collar for attaching the housing to a vehicle and a chute assembly formed of a flexible material and secured to the collar.

20 Claims, 19 Drawing Sheets

FLEXIBLE HOUSING FOR AN AIRBAG MODULE

CROSS REFERENCE TO RELATED APPLICATION

This application is a continuation-in-part of U.S. application, Ser. No. 11/174,956, filed on 5 Jul. 2005. The co-pending parent application is hereby incorporated by reference herein in its entirety and is made a part hereof, including but not limited to those portions which specifically appear hereinafter.

BACKGROUND OF THE INVENTION

This invention relates generally to an airbag module for a vehicle inflatable restraint system and, more particularly, to a housing for an airbag module.

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Various types or forms of such passive restraint assemblies have been developed or tailored to provide desired vehicle occupant protection based on either or both the position or placement of the occupant within the vehicle and the direction or nature of the vehicle collision. Automotive passenger side airbag installations generally incorporate an airbag module assembly having an inflator device within a module housing and an inflatable airbag cushion adapted to inflate out a side of the module housing. In one currently used passenger side airbag module assembly configuration the inflatable airbag cushion is adapted to inflate out a top side of the module housing, often referred to as a "top mounted" airbag cushion. Such a module assembly is installed in the dashboard of the automobile close to the windshield. Upon activation, the inflator device releases inflation gas which inflates the airbag cushion. The top mounted airbag cushion initially inflates toward the windshield and then rapidly expands down the dashboard in a direction toward the passenger.

Current passenger side airbag module assemblies often incorporate a woven nylon inflatable airbag cushion in inflation combination with a pyrotechnic or stored gas inflator device. The module housing contains the airbag in the folded, compacted configuration before inflation, and also typically contains and/or acts as a support structure for the inflator device. Typically, housings are generally rigid to perform these functions. Current housings are typically formed of stamped steel or aluminum, or glass filled nylon. The costs of producing airbag module assemblies have been increasing, due at least in part to the increase in cost of the materials to form the components such as the module housing. Vehicle manufacturers, however, desire to keep production costs down. In addition to reduced costs, equivalent or similarly performing vehicle components having a reduced weight are generally desired by vehicle manufacturers in their efforts to produce more efficient vehicles.

Thus, there is a need and a demand for an airbag module of relatively simple and lightweight design and construction and, comparatively, low or reduced cost.

SUMMARY OF THE INVENTION

A general object of the invention is to provide an improved airbag module for vehicle airbag installations.

A more specific objective of the invention is to overcome one or more of the problems described above.

The general object of the invention can be attained, at least in part, through a housing for an airbag module that contains an inflatable cushion in a compacted configuration that can be inflated by inflation gas supplied by an inflator device. The housing includes a collar for attaching the housing to a vehicle. The housing also includes a chute assembly formed of a flexible material and secured to the collar.

As compared to the invention, the prior art generally fails to provide an airbag module housing having a lightweight design and construction, and, comparatively, a low or reduced cost to manufacture.

The invention further comprehends a housing for an airbag module that contains an inflatable cushion in a compacted configuration which can be inflated by inflation gas supplied by an inflator device. The housing includes a collar formed of a rigid material for attaching the housing to a vehicle. The housing also includes a fabric piece folded and stitched to form a chute assembly. The chute assembly secures to the collar to form a housing chamber for containing the inflatable cushion.

Other objects and advantages will be apparent to those skilled in the art from the following detailed description taken in conjunction with the appended claims and drawings.

DETAILED DESCRIPTION OF THE INVENTION

The present invention provides a, comparatively, low or reduced cost, lightweight airbag module housing for use in a vehicle airbag module assembly. The housing of the invention uses a flexible material, such as a fabric, instead of, for example, the stamped metal typically used in traditional airbag module housings. The housing includes a flexible chute assembly secured to a rigid collar. The collar provides desired stiffness and support in the instrument panel plane to resist expansion during inflation of the inflatable airbag cushion. The collar allows for the use of the fabric chute assembly for containing the inflatable cushion when the inflatable cushion is in the folded, compacted configuration prior to inflation. The use of fabric instead of, for example, the steel or aluminum typically used in traditional airbag module housings desirably reduces material costs for the airbag module, as well as improving shipping efficiency.

Figure 1:
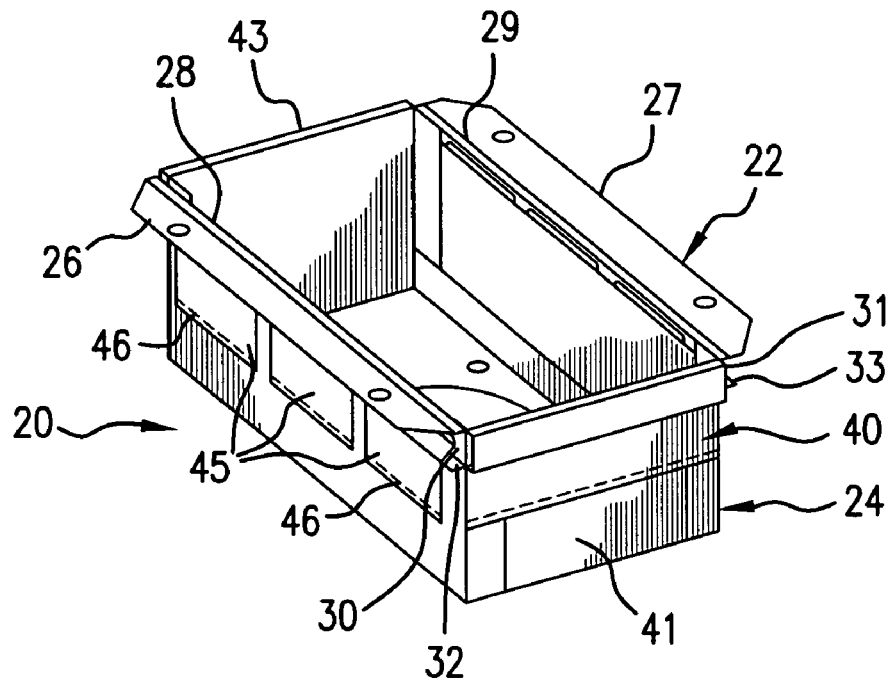
FIG. 1 is a perspective view of a housing for an airbag module according to one embodiment of the invention.

FIG. 1 shows a housing 20 for an airbag module according to one embodiment of this invention. The housing 20 includes a collar 22 and a chute assembly 24 secured to the collar 22. The collar 22 is formed of a rigid material, such as, for example, metal or plastic, to provide rigid support for the housing 20. The collar can be formed as one integral rigid material piece or from two or more connected or unconnected rigid material pieces. The collar 22 is used to attach the housing 20 to a vehicle, as discussed further below. The chute assembly 24 is formed of a flexible material, such as, for example, a woven fabric, a nonwoven fabric, molded plastic, a plastic film and combinations thereof. Examples of fabrics for use in forming the chute assembly of the invention include, without limitation, nylon fabric and polyester fabric. In the embodiment of the invention shown in FIG. 1, the collar 22 has a rectangular shape or configuration, and the assembled chute assembly 24 has a corresponding rectangular, boxlike shape or configuration. As will be appreciated by those skilled in the art, various and alternative materials, shapes and/or configurations are available for forming the housing, collar and/or chute assembly of the invention.

Figure 2:
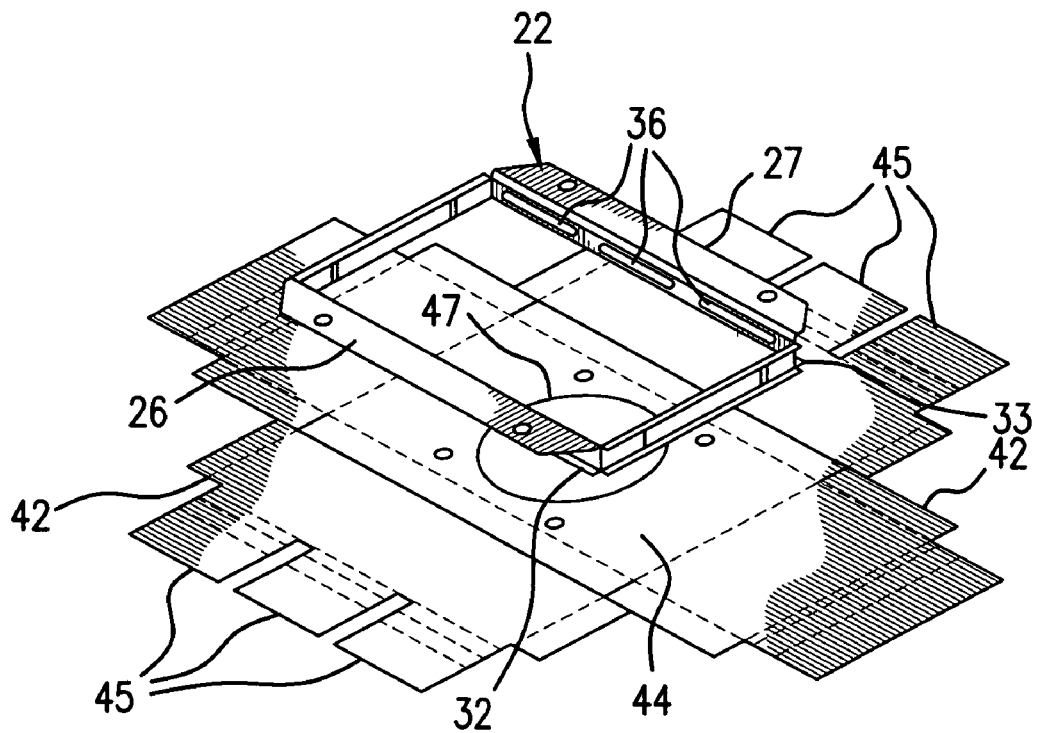
FIG. 2 is a perspective view of the housing of FIG. 1 prior to assembly.

The collar 22 includes a pair of vehicle attachment flanges 26 and 27 for attaching the collar 22 to a vehicle. The vehicle attachment flanges 26 and 27 extend outwardly at an angle, e.g., substantially perpendicular, from first edges 28 and 29 on two opposing sides 30 and 31, respectively, of the collar 22. The collar 22 also includes a pair of chute flanges 32 and 33 extending outwardly at an angle, e.g., substantially perpendicular, from the collar edges opposite first edges 28 and 29, respectively, on sides 30 and 31. The outwardly extending vehicle attachment flanges 26 and 27 and the chute flanges 32 and 33 on the collar sides 30 and 31 provide the collar 22 with a "C-shaped" configuration that provides planar stiffness, and desirably reduces and/or eliminates deformation of the collar 22 during deployment of an inflatable cushion. As shown in FIG. 2, the collar 22 includes a plurality of tab openings 36 that are disposed through portions of the collar 22 adjacent the vehicle attachment flange 26 and 27, respectively. Tab openings 36 are disposed in each of the collar sides 30 and 31, between the vehicle attachment flanges 26 and 27 and the chute flanges 32 and 33, respectively.

Referring again to FIG. 1, the chute assembly 24 includes an attachment portion 40 folded over, about or around a portion of the collar 22. The attachment portion 40 desirably extends around a top portion or edge of the chute assembly 24, and is folded about each of the sides of the collar 22, e.g., sides 30 and 31. The chute assembly 24 is secured about the collar 22 by attaching the folded attachment portion 40 to the sides or side walls, e.g., side wall 41, of the chute assembly 24. The folded attachment portion 40 desirably secures to the chute assembly sides at or toward an attachment portion end opposite the folded end 43 of the attachment portion 40.

In one embodiment of the invention, the folded attachment portion 40 attaches to the sides of the chute assembly 24 by a plurality of stitches 46. As will be appreciated by those skilled in the art following the teachings herein provided, various and alternative types, patterns, and/or numbers of stitches are available for attaching the folded attachment portion 40 to the sides of the chute assembly 24, depending upon factors such as, for example, the strength of the fabric and/or the stitching thread material. In one embodiment of the invention, the stitching is a lock or chain stitch that runs generally straight and parallel to the collar 22.

While the invention is described herein with the chute assembly attached to the collar by the attachment portion being folded over the collar and secured to the side wall of the chute assembly, the invention is not intended to be so limited. Other alternative means for securing the chute assembly to the collar are also available for the housing of the invention, such as, for example, those described further below. In alternative embodiments of the invention, the chute assembly can be secured to the collar with or without folding of a portion of the chute assembly over or around the collar. In one embodiment of this invention, the chute assembly is secured to the collar by adhesive bonding, ultrasonic bonding or insert molding of the fabric to the collar. Buttons, snaps or rivets can also be used to attach the fabric of the chute assembly to the collar. The collar or the chute assembly can also include hooks that hook to corresponding hook openings in, or metal loops attached to, the chute assembly fabric or the collar, respectively. The chute assembly can also be attached to the collar by a rod or pin that extends through one or more fabric loops disposed about the open end edge of the chute assembly. In one embodiment, the rod or pin can slide through a loop in the fabric and then slide into a receiving channel of the collar. In another embodiment, the fabric and the collar include a plurality of alternating loops that, when aligned, the rod or pin is passed through like a door hinge. In yet another embodiment, the rod or pin can pass through a plurality of spaced fabric loops in the chute assembly, and the rod can then be snapped or otherwise attached to a plurality of collar hooks.

FIG. 2 shows two overlaid cut pieces of fabric 42 before being folded and sewed to form the chute assembly 24. As will be appreciated by those skilled in the art following the teachings herein provided, the chute assembly 24 can alternatively be formed from a single piece of fabric or more than two pieces of fabric sewn or otherwise attached together. The chute assembly 24 includes an inflator opening 47 disposed in a bottom side wall 44 through which an inflator device (not shown), e.g., desirably an inflation gas diffuser of the inflator device, can be introduced into the housing 20. FIG. 2 also shows how the chute assembly attachment portion 40 can be folded about the collar 22 in the area of the vehicle attachment flanges 26 and 27. The attachment portion 40 includes a plurality of attachment tabs 45. Each of the plurality of attachment tabs 45 is sized or configured to extend through a corresponding one of the tab opening 36 disposed in the collar 22. As shown in FIG. 1, the attachment tabs 45 each extend through a corresponding tab opening 36, are folded about the collar 22 and attached, desirably by the plurality of stitches 46, to the sides of the chute assembly 24. The attachment tabs 45 and the tab openings 36 allow the attachment portion 40 to be secured about the portions or sides of the collar 22 adjacent the vehicle attachment flanges 26 and 27 without extending over or about the vehicle attachment flanges 26 and 27. As will be appreciated by those skilled in the art following the teachings herein provided, various and alternative sizes, shapes and numbers of tab openings and attachment tabs are available for use in the housing of the invention.

The attachment tabs 45 are also folded over the chute flanges 32 and 33, respectively. The folding of the attachment tabs 45 over the chute flanges 32 and 33 can desirably provide lateral support for the sides of the chute assembly 24 by providing a structural connection between the chute assembly 24 and the collar 22.

Figure 3:
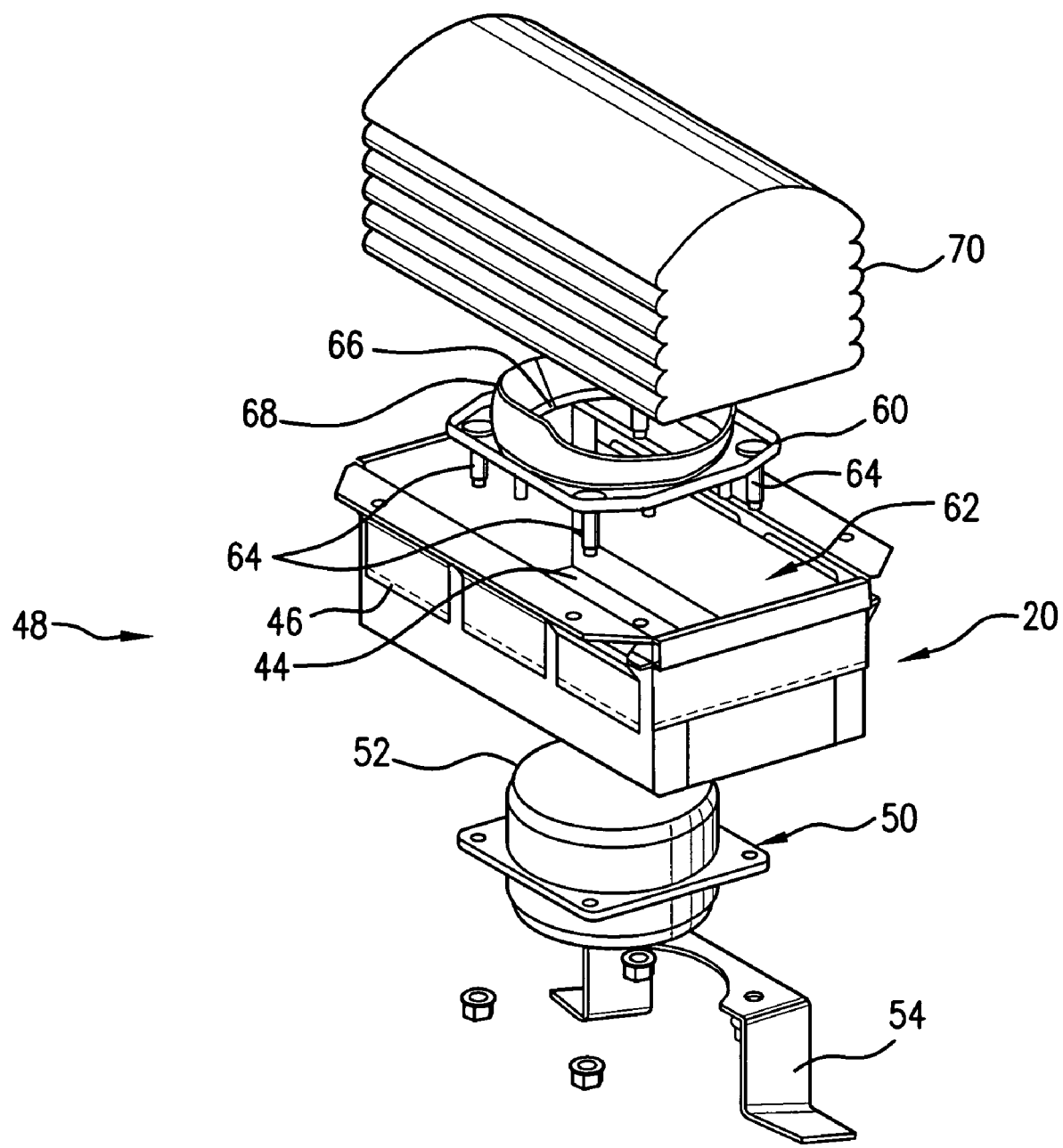
FIG. 3 is an exploded view of an airbag module including the housing of FIG. 1.

FIG. 3 shows an exploded view of an airbag module 48 including the housing 20 of FIG. 1. An inflator device 50 is disposed beneath the housing 20. The inflator device 50 shown in FIG. 3 is a disk-shaped inflator device, such as is commonly used in driver and/or passenger side airbag assemblies. As will be appreciated by those skilled in the art following the teachings herein provided, various and alternative inflator devices, such as, for example, a cylindrical side-discharge inflator device, are available for use with the invention. Desirably, a portion of the inflator device 50, such as an inflation gas diffuser 52, extends through the inflator opening 47 of the housing 20. A mounting bracket 54 is used to connect the inflator device 50 to the vehicle. The housing 20 is secured to the inflator device 50 by a retainer deflector 60. The retainer deflector 60 is disposed within a housing chamber 62 and an inflatable cushion 70, and connects to the inflator device by bolts 64 through the housing bottom side wall 44. The retainer deflector 60 includes a circular opening 66, adapted to fit over and surround the inflator diffuser 52.

The inflatable cushion 70 is disposed, at least partially, within the housing chamber 62 when the inflatable cushion 70 is in the compacted configuration prior to inflation. The inflatable cushion 70 is connected to the retainer deflector 60. The inflatable cushion 70 has an opening (not shown) that connects over the retainer deflector 60 and is clamped between the retainer deflector 60 and the housing 20, such that the inflator diffuser 52 is in inflation combination with the inflatable cushion 70. Upon receipt of an activation signal, the inflator device 50 supplies inflation gas through the inflator diffuser 52 to inflate the inflatable cushion 70. The inflatable cushion 70 inflates out the open end of the housing 20 defined by the collar 22. The retainer deflector 60 desirably includes at least one deflector portion 68 which directs inflation gas toward the open end of the housing 20 instead of laterally toward the side walls of the inflatable cushion 70 and housing 20, thereby promoting desired upward inflation of the inflatable cushion 70. As will be appreciated by those skilled in the art following the teachings herein provided, the retainer diffuser is sized and shaped according to the size and shape of the housing and/or inflator device. As will be further appreciated, a retainer deflector may not be needed for use with particular inflator devices and/or airbag module configurations.

Figure 4:
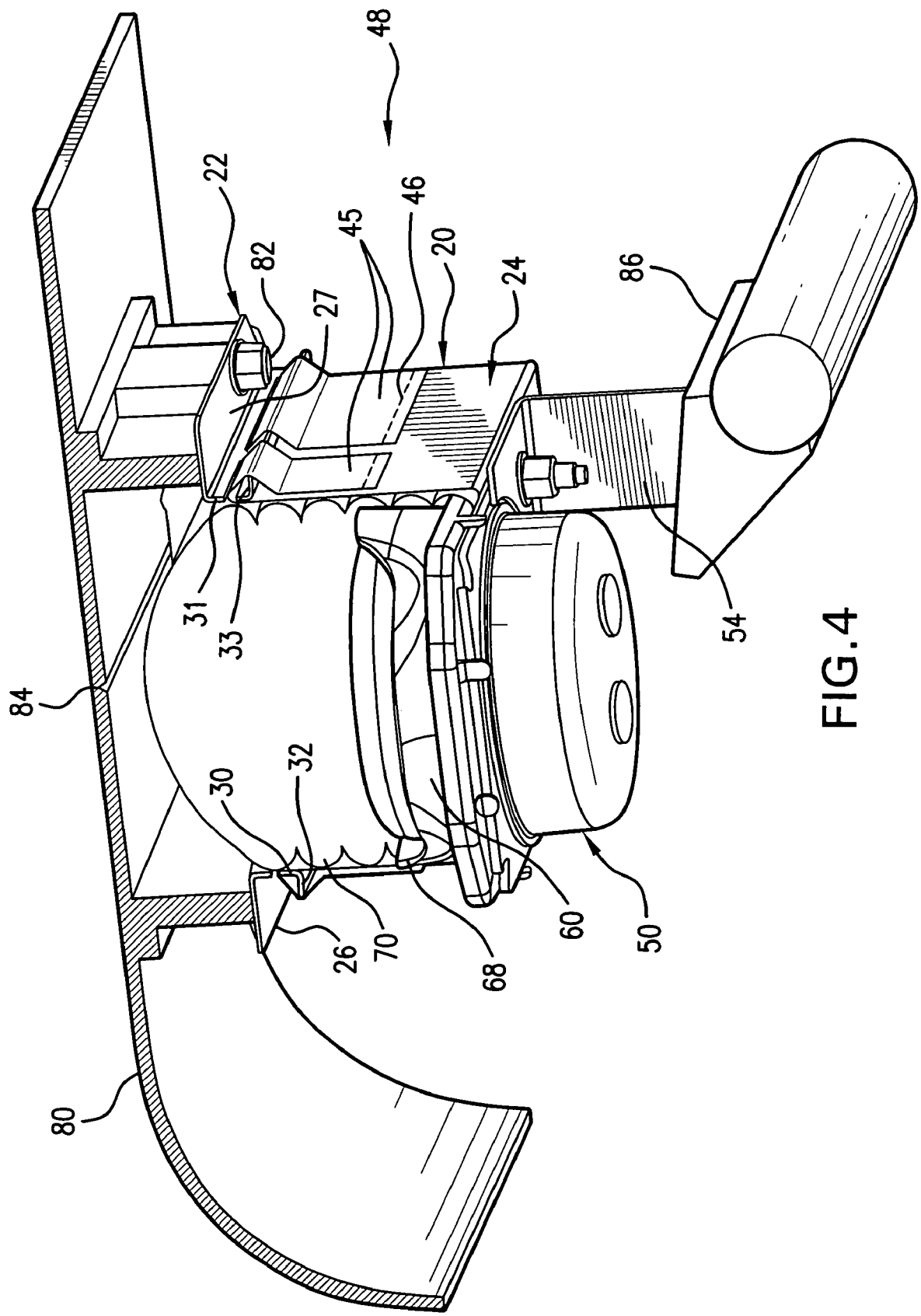
FIG. 4 is a partial sectional view of the airbag module of FIG. 3 connected to a vehicle.

FIG. 4 shows the airbag module 48 connected to an instrument panel 80 of a vehicle. The housing 20 is fastened, such as by one or more fasteners 82, to the instrument panel 80. The instrument panel 80 includes a weakening or crease 84, which is opened by an inflating inflatable cushion 70. The mounting bracket 54 secures the inflator device 50 to a beam 86 of the vehicle. The beam 86 supports the weight of the inflator device 50, the inflatable cushion 70 and the mounting bracket 54, thereby advantageously removing weight from the instrument panel 80. The lower mounting by the mounting bracket 54 also desirably supports the snap loading of the inflatable cushion 70 during inflatable cushion 70 deployment, and holds the inflator device 50 and retainer deflector 60 in position during loading.

The housing and/or airbag module of the invention further provide(s) the following additional advantages over the prior art stamped metal housings. The flexible material of the housing generally reduces both cost and weight, as compared to the stamped metal housings typically used currently in airbag modules. The flexible chute assembly also allows changing of the deployment angle for the inflatable cushion without stamping retooling, which can allow for design flexibility and reduced engineering time for vehicle manufacturers. The flexible chute assembly also allows for larger dimensional tolerances between the instrument panel and the lower mounting beam. Furthermore, the collapsibility of the flexible housing provides better shipping efficiency, as compared to the rigid and bulkier metal housings. When installed, the flexible housing can also desirably provide or allow for improved head impact properties of the instrument panel.

Figure 5:
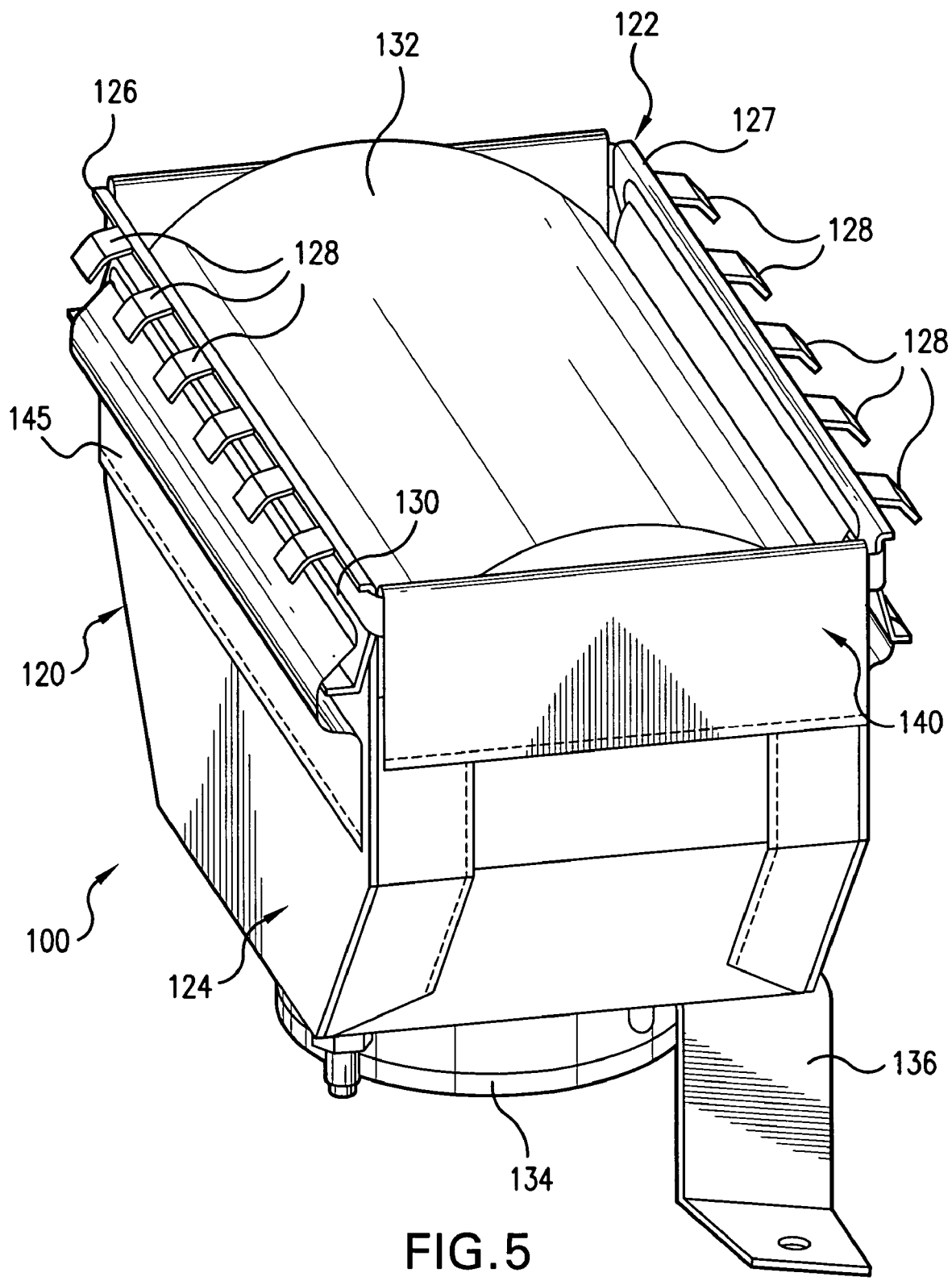
FIG. 5 is a perspective view of an airbag module of another embodiment of the invention.

FIG. 5 illustrates an airbag module 100 according to another embodiment of the invention. The airbag module 100 has a housing 120 including a collar 122 and a chute assembly 124 secured to the collar 122. As discussed above, the chute assembly 124 is formed of a flexible material. The collar 122 is formed of a rigid material to provide rigid support for the housing 120 and for attaching the housing 120 to a vehicle.

The collar 122 includes a pair of vehicle attachment flanges 126 and 127 for attaching the collar 122 to the vehicle. The vehicle attachment flanges 126 and 127 each include a plurality of attachment hooks 128 for attaching the collar to the vehicle. The collar 122 further differs from the collar 22 discussed above in that the collar 122 includes only two tab openings 130. However, as discussed above, the invention is not intended to be limited to a particular number of tab openings, as various and alternative numbers of tab openings can be used in the collar of the invention, depending on need. The two tab openings 130 are disposed on opposing sides of the collar 122.

The chute assembly 124 is desirably formed of a fabric material and has an alternative shape or configuration to the chute assembly 24 discussed above. The attachment portion 140 is folded over a portion of the collar 122 and secured to the outer side of the chute assembly 124 by a plurality of stitches. The attachment portion 140 includes two attachment tabs 145. Each of the attachment tabs 145 extends through a corresponding tab opening 130 and is folded over or about a portion of the collar 122. As discussed above, an inflatable cushion 132 is contained within the housing 120 and an inflator device 134 is disposed in inflation combination with the inflatable cushion 132 through the housing 120. A mounting bracket 136 is connected to the inflator device 134 for connecting the inflator device 134 to a vehicle.

Figure 6:
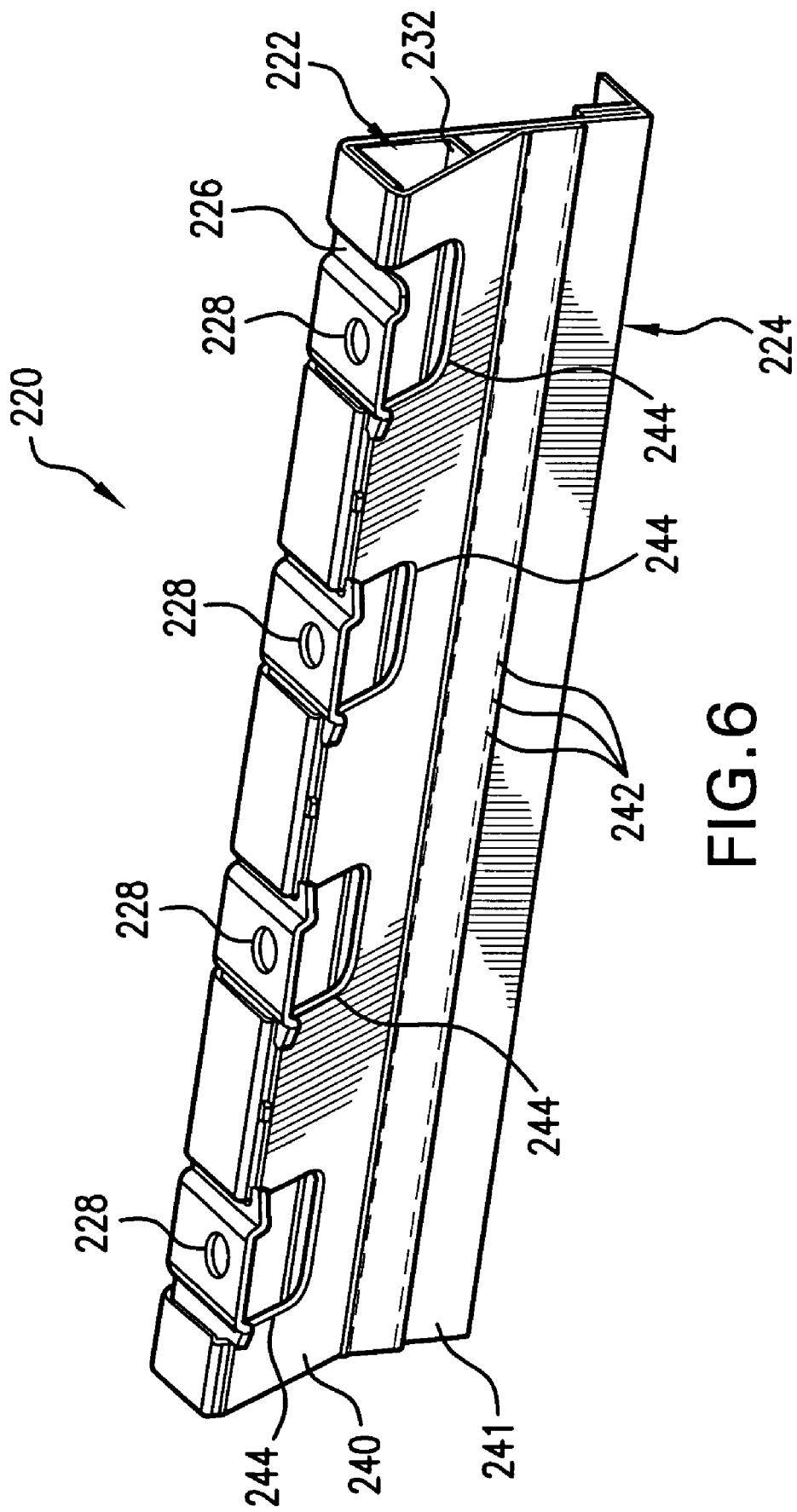
FIG. 6 is a perspective view of a section of a housing of yet another embodiment of the invention.
Figure 7:
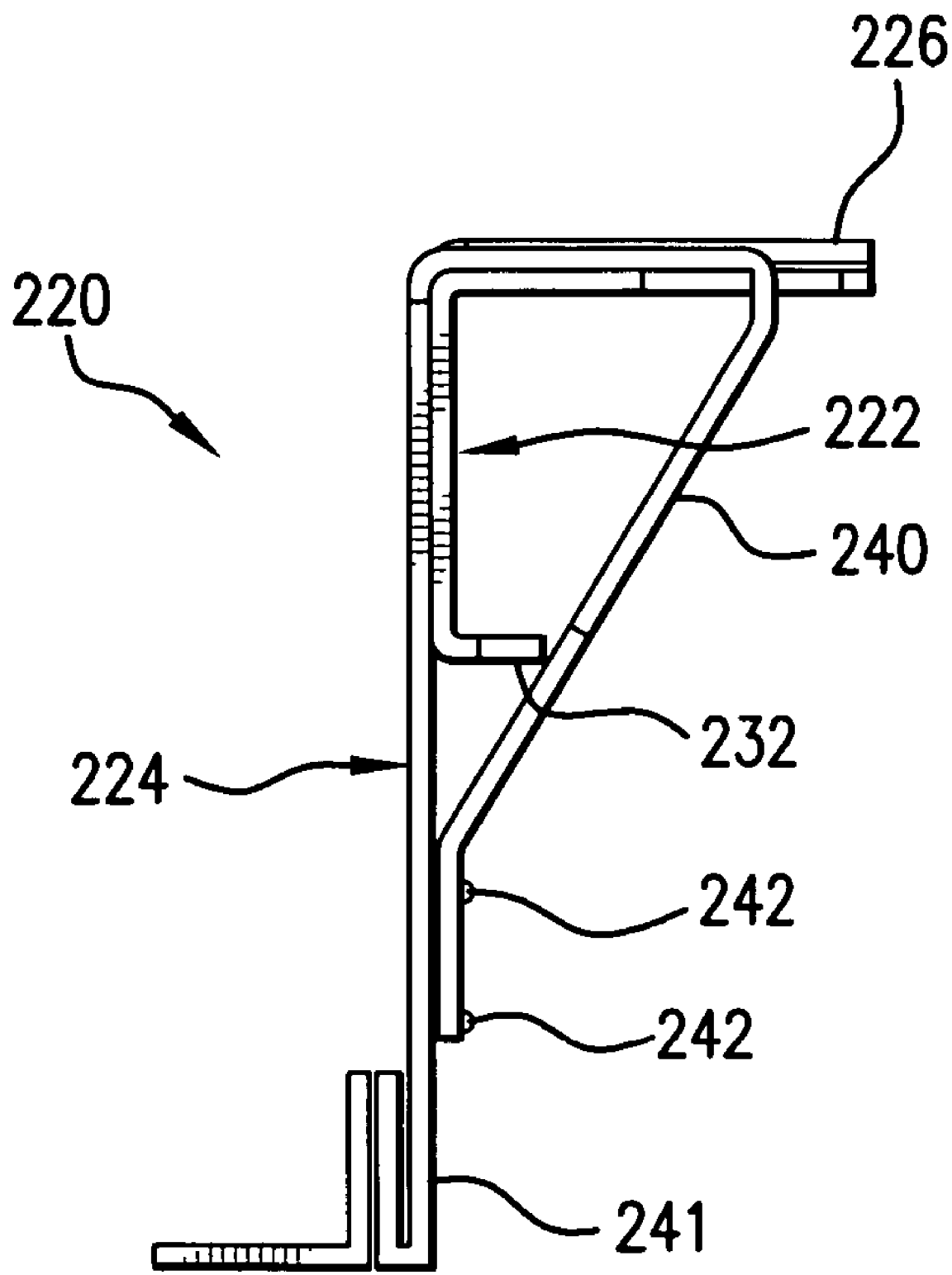
FIG. 7 is an end view of the housing section shown in FIG. 6.

FIGS. 6 and 7 illustrate another alternative embodiment of a collar and chute assembly for the housing of the invention. FIG. 6 shows a perspective view of a section of a housing 220. FIG. 7 is an end view of the housing section shown in FIG. 6.

The housing 220 includes a collar 222 formed of a rigid material, such as metal, and a chute assembly 224 formed of a flexible material, such as a fabric. The collar 222 includes a vehicle attachment flange 226 extending outwardly from the collar 222 for attaching the collar 222 to a vehicle. The vehicle attachment flange 226 includes a plurality of fastener openings 228, through which a fastener (not shown) such as a bolt, can extend for attaching the vehicle attachment flange 226, and the housing 220, to a vehicle. As shown in FIG. 7, the collar 222 also includes an outwardly extending chute flange 232 opposite the vehicle attachment flange 226, thereby providing the collar 222 with a "C-shaped" configuration.

The chute assembly 224 includes an attachment portion 240 folded over or about the collar. In the embodiment of the invention shown in FIGS. 6 and 7, the attachment portion 240 is folded over or about the vehicle attachment flange 226 and secured to the side wall 241 of the chute assembly 224 by a plurality of stitches 242. The attachment portion 240 includes a plurality of flange openings 244. Each of the flange openings 244 is aligned with one of a plurality of fastener openings 228. The flange openings 244 are desirably sized to reduce or eliminate obstruction of the fastener openings 228 during attachment of the housing 220 to a vehicle. As will be appreciated by those skilled in the art following the teachings herein provided, various sizes, shapes and configurations are available for the flange openings and the fastener openings. In one embodiment of the invention, the vehicle attachment flange includes a plurality of attachment hooks, such as discussed above and shown in FIG. 5, the attachment portion folds over the vehicle attachment flange, and each of the chute assembly flange openings is aligned with one of a plurality of attachment hooks.

Figure 8:
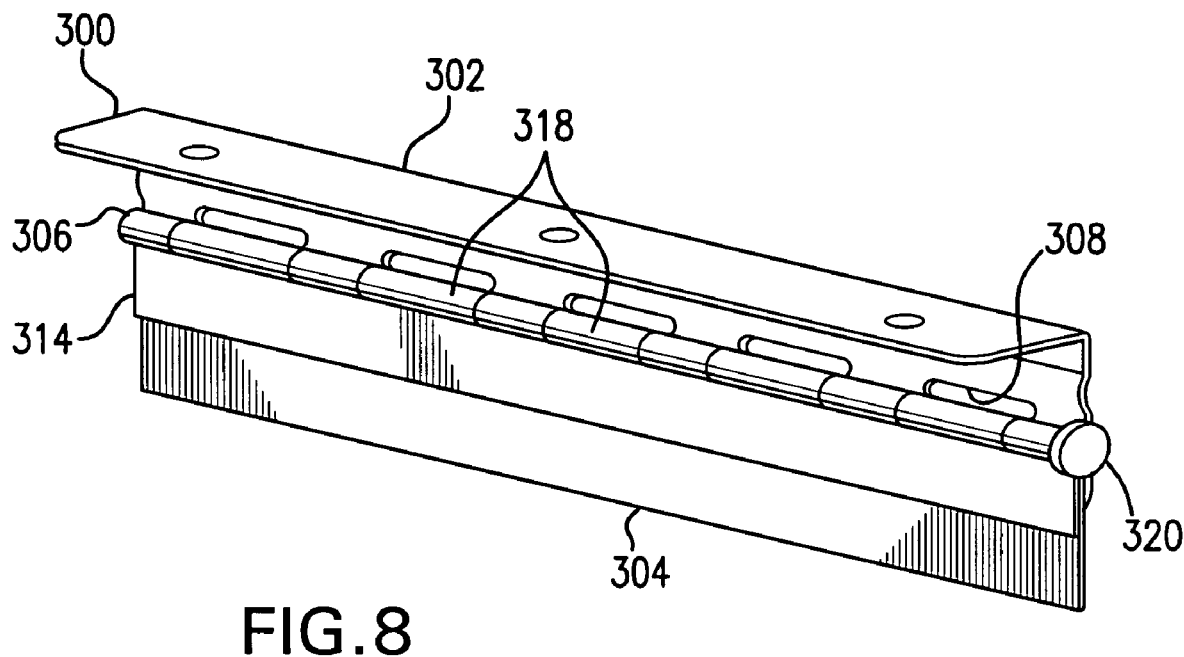
FIG. 8 is a perspective view of a section of a housing of yet another embodiment of the invention.
Figure 9:
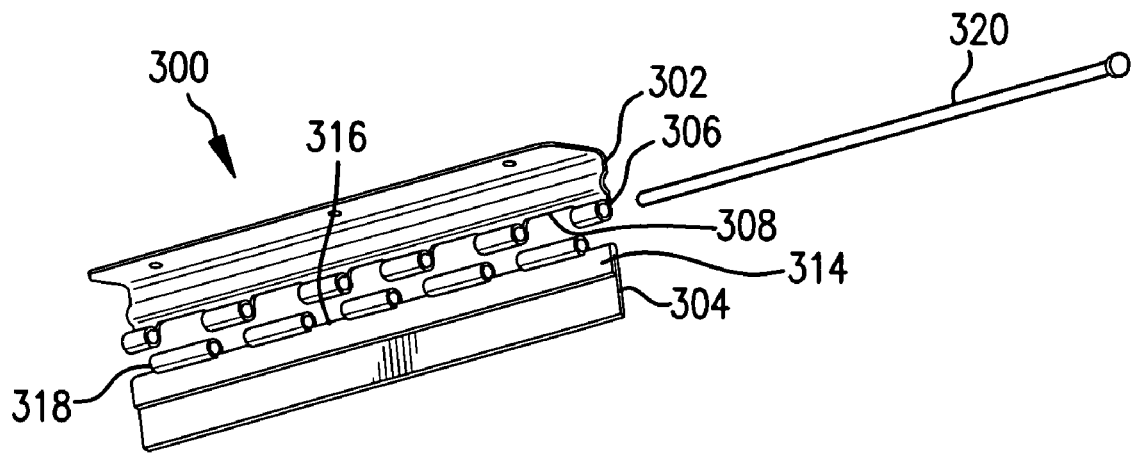
FIG. 9 is an exploded view of the housing section shown in FIG. 8.

FIGS. 8 and 9 illustrate another alternative embodiment of a collar and chute assembly for the housing of the invention. FIG. 8 shows a perspective view of a section of a housing 300. FIG. 9 is an exploded view of the housing section shown in FIG. 8.

The housing 300 includes a collar 302 desirably formed of a rigid material and a chute assembly 304 formed of a flexible material. The collar 302 includes a plurality of loops 306 disposed at a collar edge 308. The collar edge 308 is a bottom edge of the collar disposed opposite a vehicle attachment flange 310 for attaching the collar 302 to a vehicle. At least one, and desirably each, of the plurality of loops 306 is generally spaced apart from one or more adjacent loops 306. The chute assembly 304 includes an attachment portion 314 folded to form a chute assembly edge 316 including a plurality of loops 318. At least one, and desirably each, of the plurality of loops 318 is also generally spaced apart from one or more adjacent loops 318.

The chute assembly 304 is secured to the collar 302 by a pin 320. As shown in FIGS. 8 and 9, one or more loops 318 of the chute assembly 304 align with and are disposed adjacent to one or more loops 306 of the collar 302. The pin 320 extends through the aligned loops 306 and loops 318 to secure the chute assembly 304 to the collar 302 in a "hinge-type" manner. As will be appreciated by those skilled in the art following the teachings herein provided, various sizes, shapes and configurations are available for the collar, chute assembly, loops and the pin. For example, in one embodiment of this invention the collar is a planar collar, and the loops are disposed at an inside edge of the collar.

Figure 10:
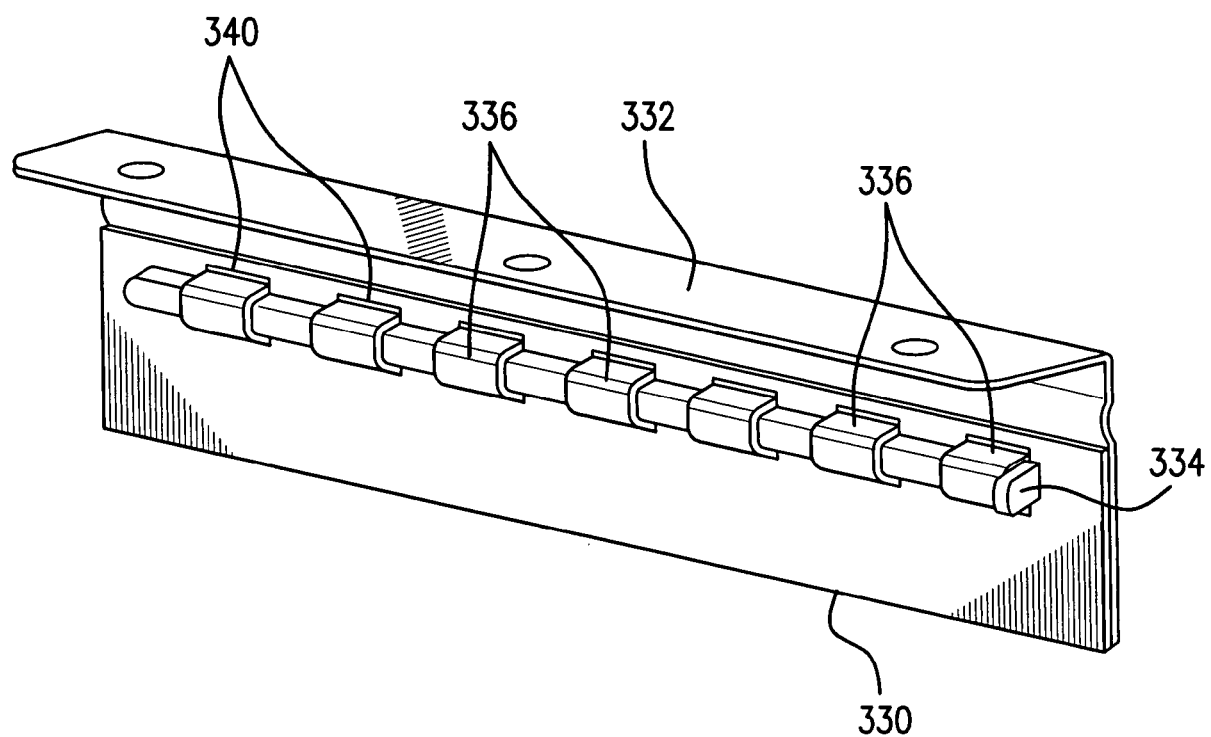
FIG. 10 is a perspective view of a section of a housing of yet another embodiment of the invention.
Figure 11:
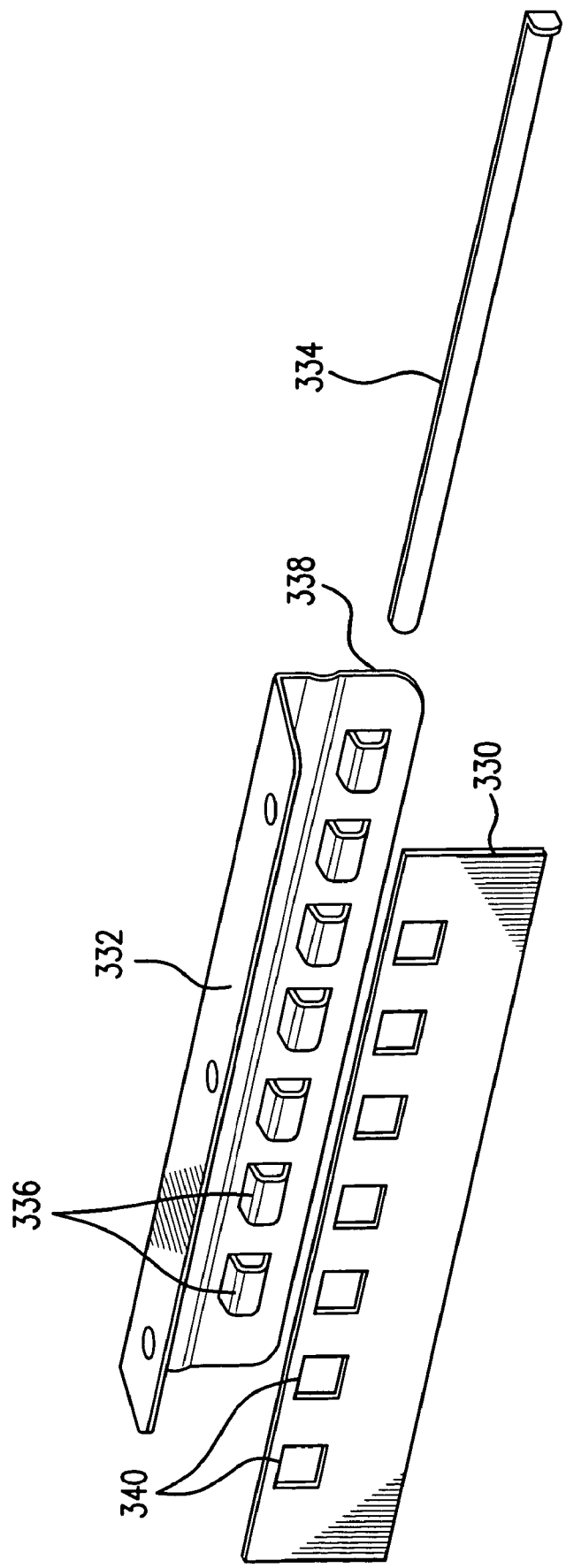
FIG. 11 is an exploded view of the housing section shown in FIG. 10.

FIGS. 10 and 11 illustrate an alternative embodiment for securing a chute assembly 330 to a collar 332 by a pin 334. The collar 332 includes a plurality of lanced sections 336 in and extending outward from a side 338 of the collar 332 to form a passage through which the pin 334 is configured to fit. The chute assembly 330 includes a plurality of openings 340 each sized and adapted to fit over a corresponding one of the lanced sections 336. The chute assembly 330 is disposed adjacent the collar side 338 and at least one, and desirably each, of the lanced sections 336 is disposed through a corresponding one of the openings 340. As shown in FIG. 10, with the openings 340 disposed over the lanced sections 336, the pin 334 extends through the lanced sections 336. The lanced sections 336 hold the pin 334 in a position against the chute assembly 330, thereby securing the chute assembly 330 to the collar 332.

As will be appreciated by those skilled in the art following the teachings herein provided, various sizes, shapes and configurations are available for the lanced sections, openings and the pin. For example, in one embodiment of the invention, which is essentially the opposite of the embodiment of FIGS. 10 and 11, lanced sections are formed in the chute assembly and the corresponding openings are formed in the collar. The flexible lanced sections fit through the collar openings and the pin is placed through the passageway formed by the aligned lanced sections.

Figure 12:
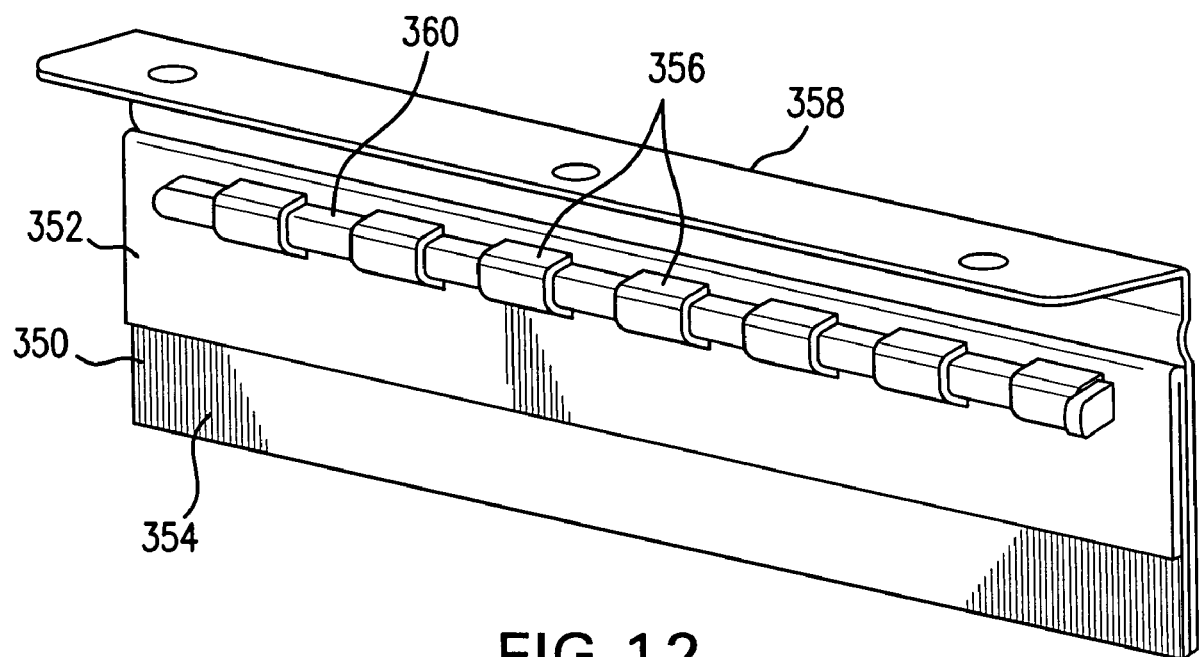
FIG. 12 is a perspective view of a section of a housing of yet another embodiment of the invention.
Figure 13:
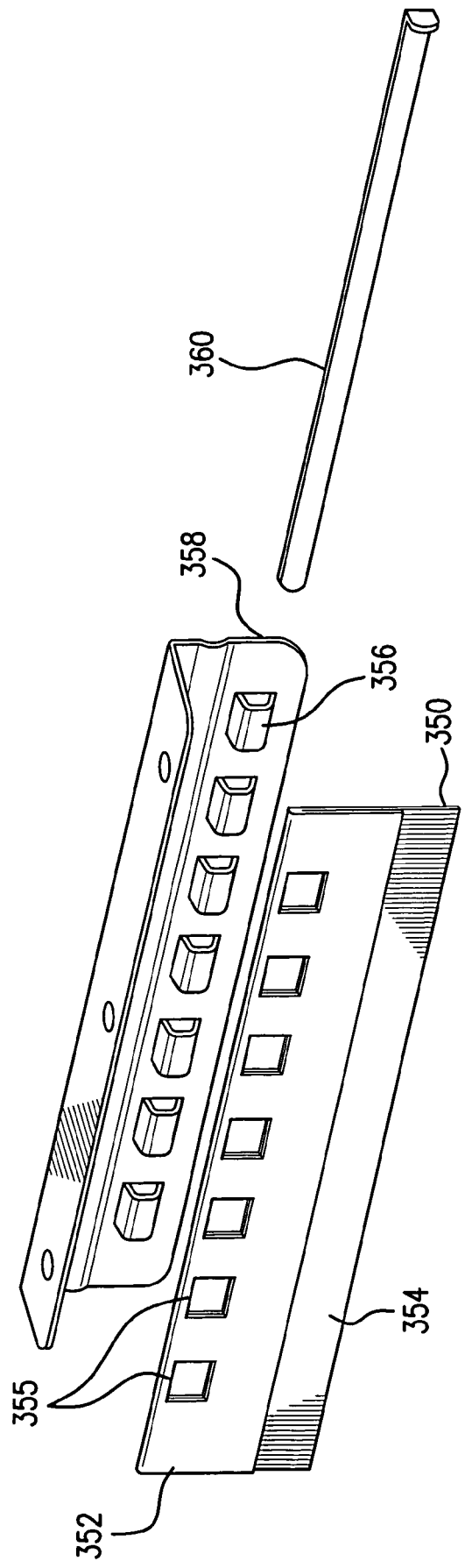
FIG. 13 is an exploded view of the housing section shown in FIG. 12.

FIGS. 12 and 13 illustrate a variation of the embodiment shown in FIGS. 10 and 11. In the embodiment shown in FIGS. 12 and 13, a chute assembly 350 includes a folded portion 352 that is folded back on and overlaps a side wall 354 of the chute assembly 350. Both the folded portion 352 and the overlapped side wall 354 include openings 355 that are aligned and adapted to fit over a corresponding one of a plurality of lanced sections 356 of a collar 358. As show in FIG. 12, a pin 360 extends through the lanced sections 356 to secure the chute assembly 350 to the collar 358. Folding of the chute assembly 350 to provide one or more additional layers, for example, the folded portion 352, desirably provides increased strength and tear resistance to the chute assembly 352.

Figure 14:
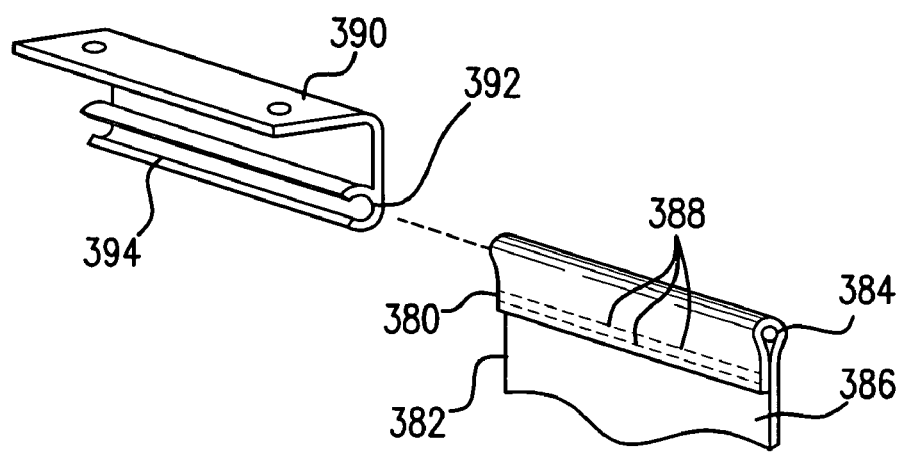
FIG. 14 is an exploded sectional view of a section of another embodiment of a housing of the invention.

FIG. 14 illustrates an exploded view of another embodiment of a collar and chute assembly for the housing of the invention. In the embodiment of FIG. 14, a folded portion 380 of a chute assembly 382 is disposed or wrapped around a pin 384. The folded portion 380 can be desirably attached back to a side wall 386 of the chute assembly 382 by various and alternative means known to those skilled in the art, such as, for example, stitching and/or adhesive bonding. A collar 390 includes a mating channel 392 disposed along a bottom edge of the collar 390. The mating channel 392 has a "C-shaped" configuration appropriately sized and adapted to receive the wrapped tubular pin. The collar 390 and the mating channel 392 can be desirably constructed or formed using an extrusion process, such as employing any extrudable material, for example, aluminum, plastic or magnesium, or a stamping process.

The wrapped pin 384 is desirably designed and constructed to slide into the mating channel 392 to secure the chute assembly 382 to the collar 390. A longitudinal slot 394 of the mating channel 392 is desirably appropriately sized to allow the flexible material of the chute assembly 382 to slide with the pin 384 while retaining the wrapped pin 384 within the mating channel 392. As will be appreciated by those skilled in the art following the teachings herein provided, various sizes, shapes, placements and configurations are available for the mating channel, the folded portion, the stitches and the pin.

Figure 15:
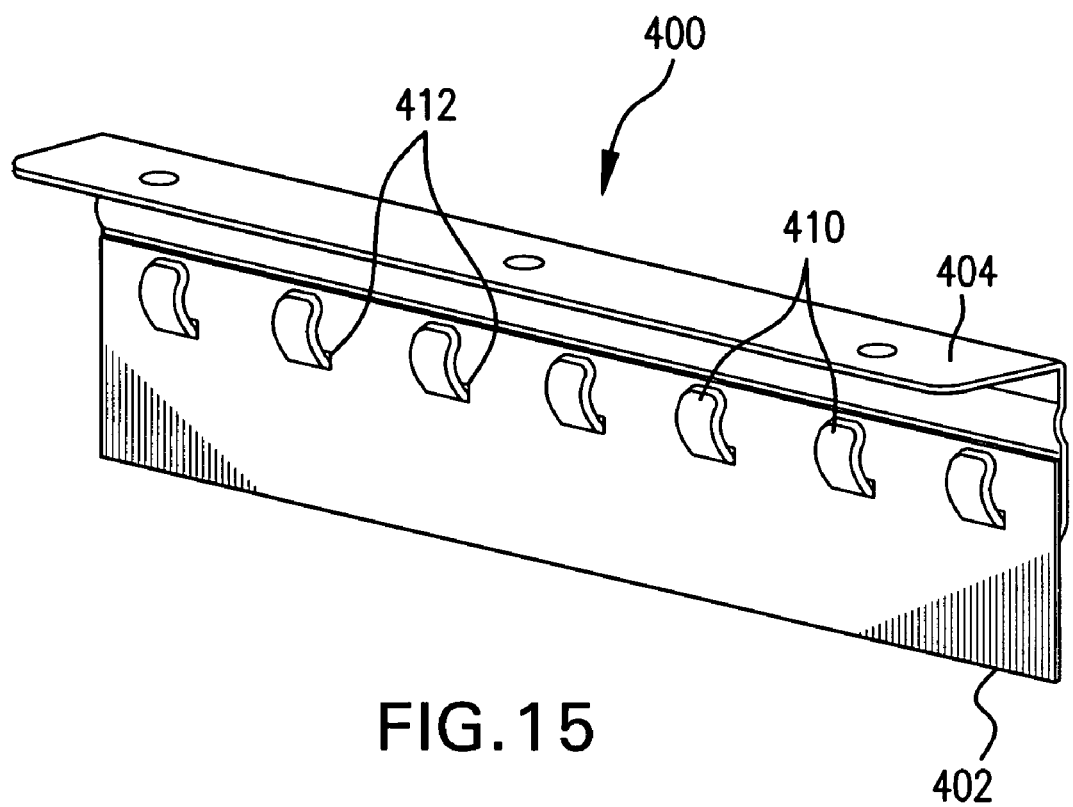
FIG. 15 is a perspective view of a section of a housing of yet another embodiment of the invention.
Figure 16:
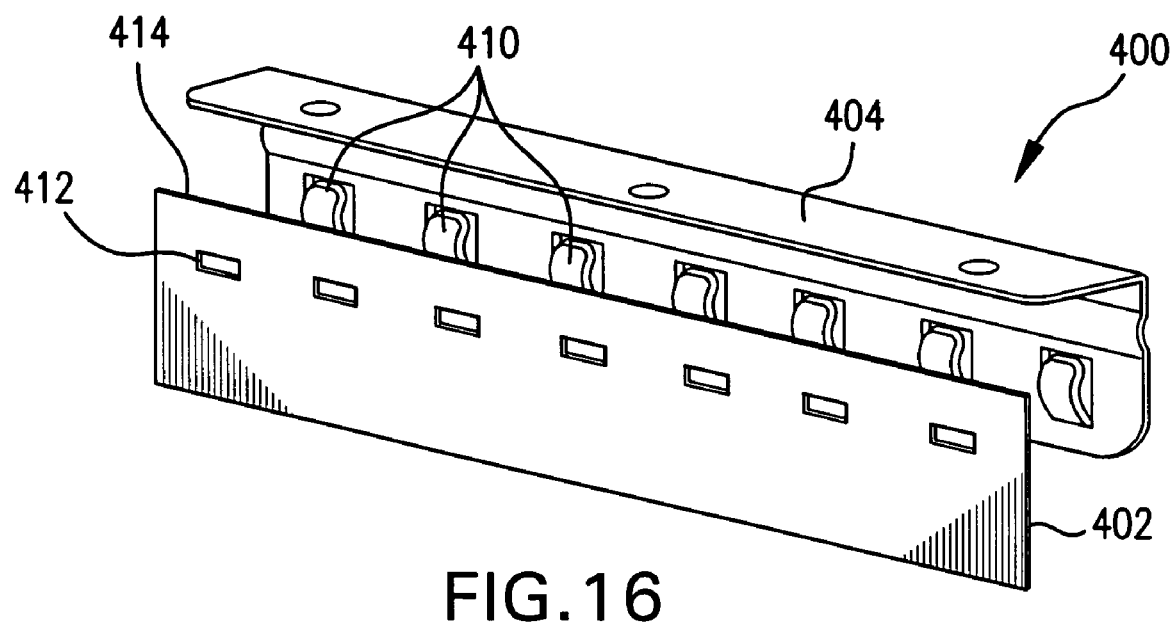
FIG. 16 is an exploded view of the housing section shown in FIG. 15.

FIGS. 15 and 16 illustrate another alternative embodiment of a collar and chute assembly for the housing of the invention. FIG. 15 shows a perspective view of a section of a housing 400. FIG. 16 is an exploded view of the housing section shown in FIG. 15.

The section of the housing 400 includes a chute assembly 402 secured to a collar 404 by a plurality of hooks 410. The chute assembly 402 includes a plurality of openings 412 generally spaced apart and aligned near a top edge 414. As shown in FIG. 15, at least one, and desirably each, of the plurality of openings 412 is generally disposed over a corresponding one of the plurality of hooks 410 to secure the chute assembly 402 to the collar 404.

Figure 17:
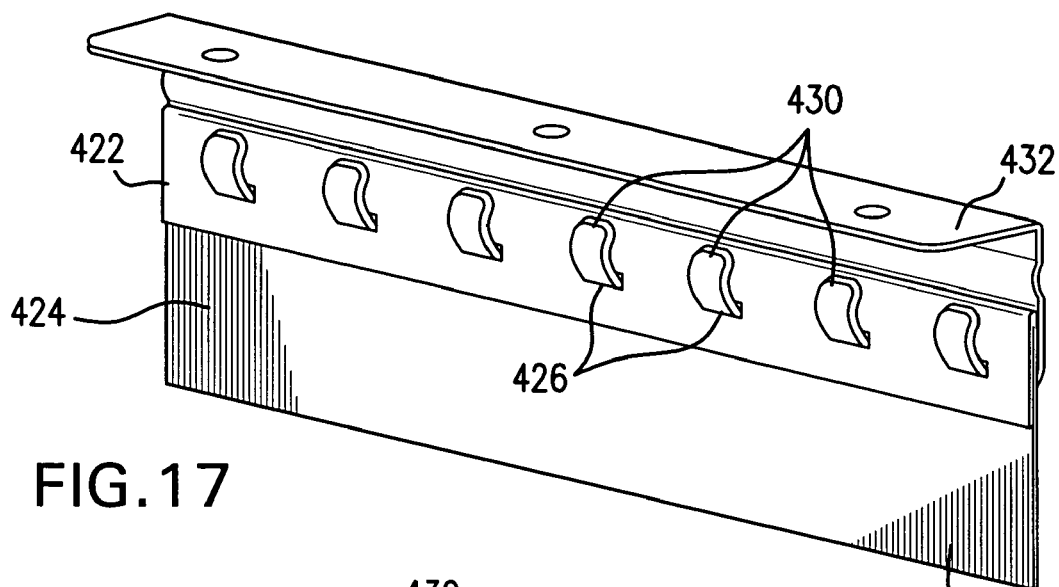
FIG. 17 is a perspective view of a section of a housing of yet another embodiment of the invention.
Figure 18:
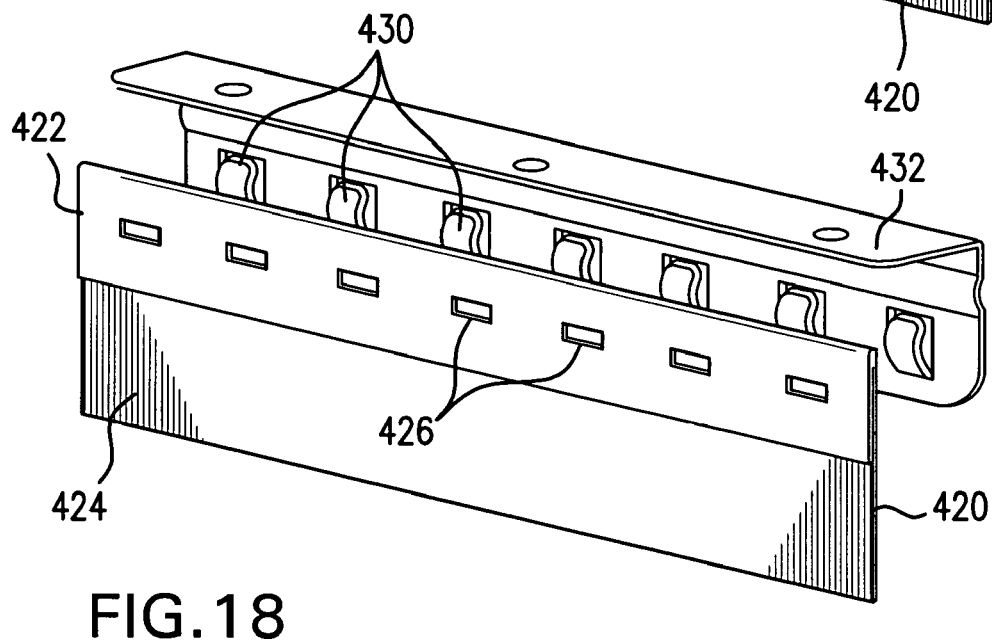
FIG. 18 is an exploded view of the housing section shown in FIG. 17.

FIGS. 17 and 18 illustrate a variation of the embodiment shown in FIGS. 15 and 16. In the embodiment shown in FIGS. 17 and 18, a chute assembly 420 includes a folded portion 422 that is folded back on and overlaps a side wall 424 of the chute assembly 420. The folded portion 422 can be attached to the side wall 424 by various and alternative means known to those skilled in the art, such as, for example, stitching and/or adhesive bonding. Both the folded portion 422 and the overlapped side wall 424 include openings 426 that are aligned and adapted to fit over a corresponding one of a plurality of hooks 430 of a collar 432. As discussed above, such folding of the chute assembly side wall 424 to provide one or more additional layers, for example, the folded portion 422, desirably provides the chute assembly 420 with increased strength and tear resistance.

In another embodiment of the invention, the chute assembly includes metal loops or eyelets attached to the flexible material, and each of the metal loops or eyelets hook over a corresponding hook on the collar. The metal loops or eyelets can provide desirable support to the flexible material forming the chute assembly.

As will be appreciated by those skilled in the art following the teachings herein provided, various sizes, shapes, placements and configurations are available for the hooks and corresponding openings of the invention. In the embodiment illustrated in FIGS. 15 and 16, each of the hooks 410 is stamped and bent outward from the collar 404. In an alternative embodiment, one or more of the plurality of hooks comprises an attachment arm that the flexible material can hook onto or over. The embodiment of the invention illustrated in FIG. 19 illustrates, without limitation, an embodiment of an exemplary attachment arm according to the invention.

Figure 19:
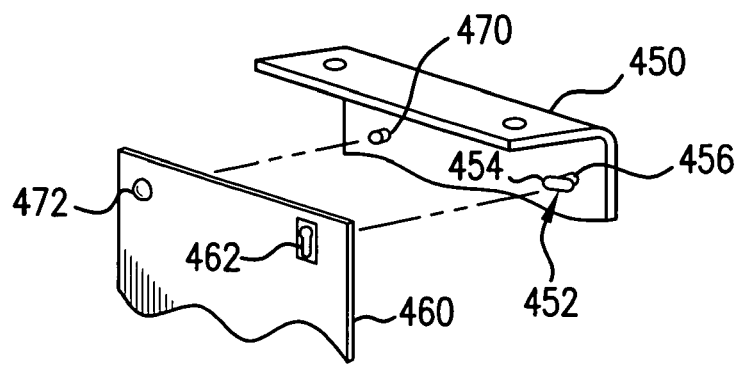
FIG. 19 is an exploded sectional view of another embodiment of a housing of the invention.

In FIG. 19, a collar 450 includes an attachment arm 452 having a crossbar 454 disposed on an end of a stem 456 that extends from the collar 450. As shown in FIG. 19, the attachment arm has a "T-shaped" configuration. As will be appreciated by those skilled in the art following the teachings herein provided, various and alternative sizes, shapes, placements and configurations are available for protruding attachment arms of this invention. As an alternative, for example, a circular shaped disk or button can be substituted for the crossbar 454 on the stem 456 to provide a "mushroom-shaped" attachment arm. The chute assembly 460 includes a correspondingly shaped opening 462. The attachment arm 452 extends through the opening 462 to secure the chute assembly 420 to the collar 450. The collar 450 also includes either a male or female snap portion 470 on an opposing side end from the attachment arm 452. The chute assembly 460 includes the corresponding other of the male or female snap portion 472 for snapping the chute assembly 460 to the collar 450. As will be appreciated by those skilled in the art following the teachings herein provided, the chute assembly can be connected to the collar according to the invention solely by a plurality of snaps or attachment arms, instead of the combination shown in FIG. 19.

Figure 20:
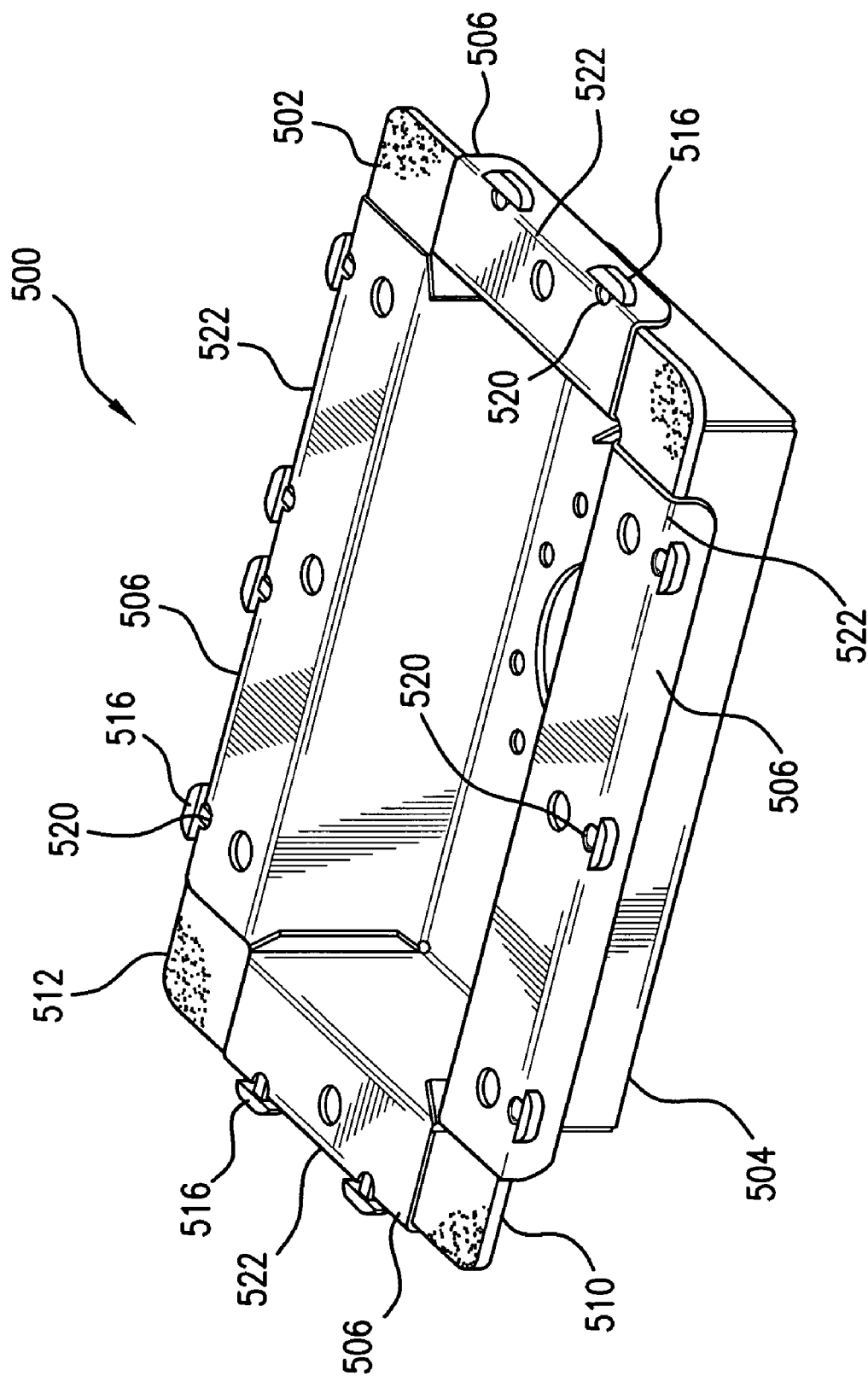
FIG. 20 is a perspective view of a section of a housing of yet another embodiment of the invention.
Figure 21:
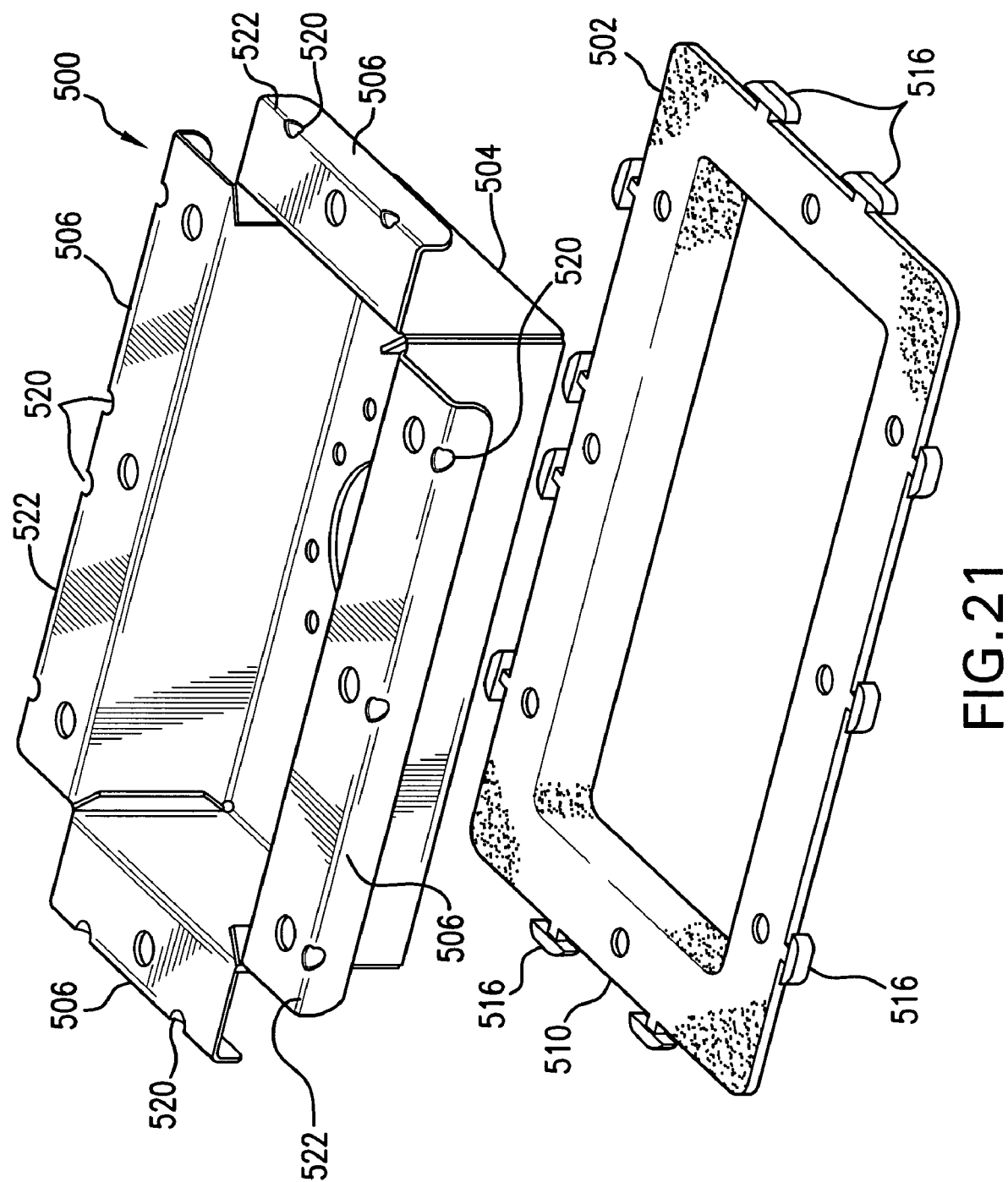
FIG. 21 is an exploded view of the housing section shown in FIG. 20.

FIGS. 20 and 21 illustrate another alternative embodiment of the invention, where a chute assembly is secured to a collar by a plurality of hooks. The housing 500 includes a collar 502 and a chute assembly 504. The chute assembly 504 is folded into an assembled configuration and includes attachment portions 506 which are folded over a portion, more particularly a vehicle attachment flange 510, of the collar 502. The vehicle attachment flange 510 includes along an outside edge 512 a plurality of hooks 516. The attachment portions 506 include a plurality of hook openings 520 disposed along a fold 522 on each of the attachment portions 506. In the assembled configuration of FIG. 20, at least one, and desirably each, of the hook openings 520 are generally disposed over a corresponding one of the hooks 516 to secure the chute assembly 504 to the collar 502.

Figure 22:
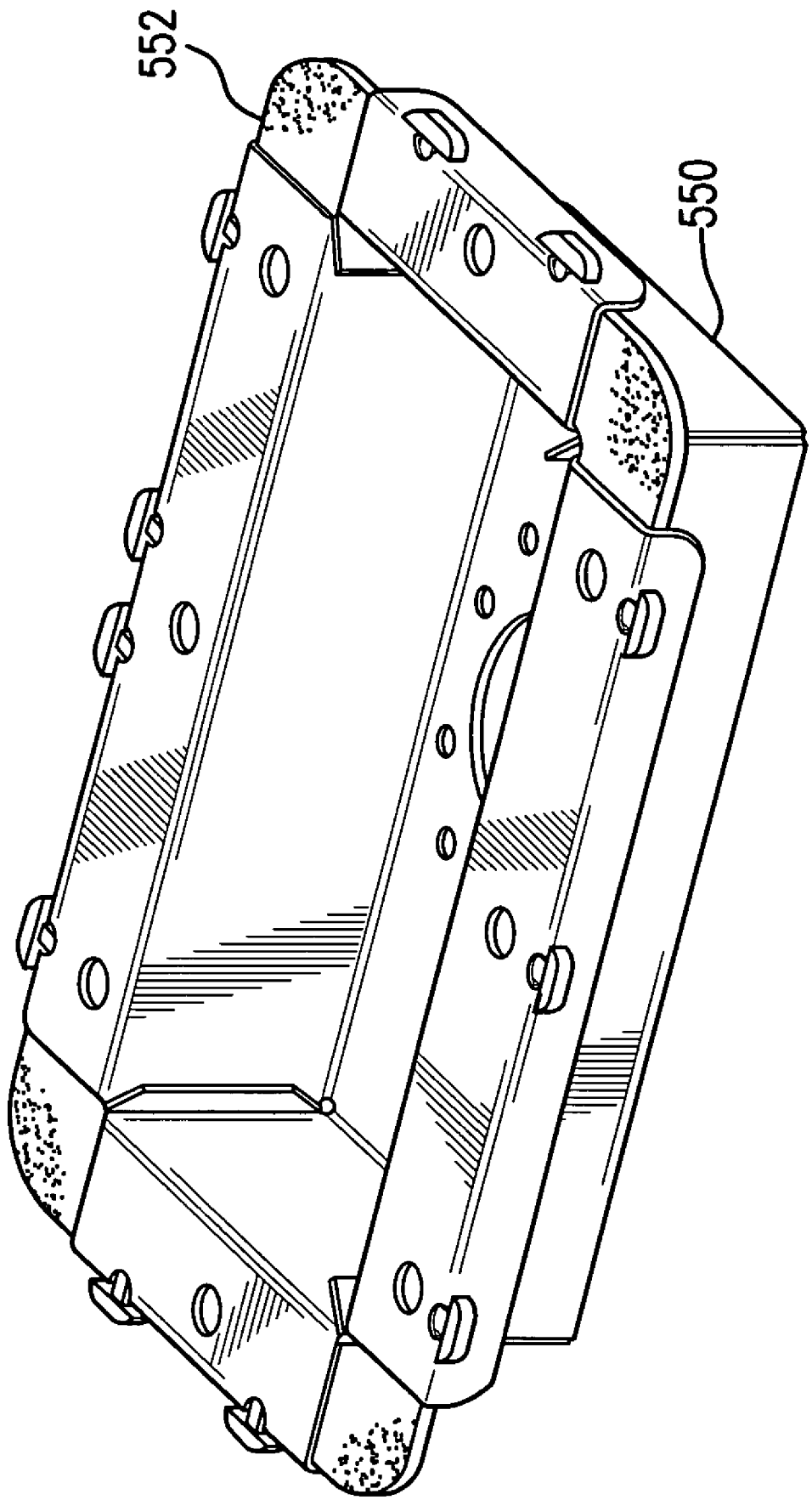
FIG. 22 is a perspective view of a section of a housing of yet another embodiment of the invention.
Figure 23:
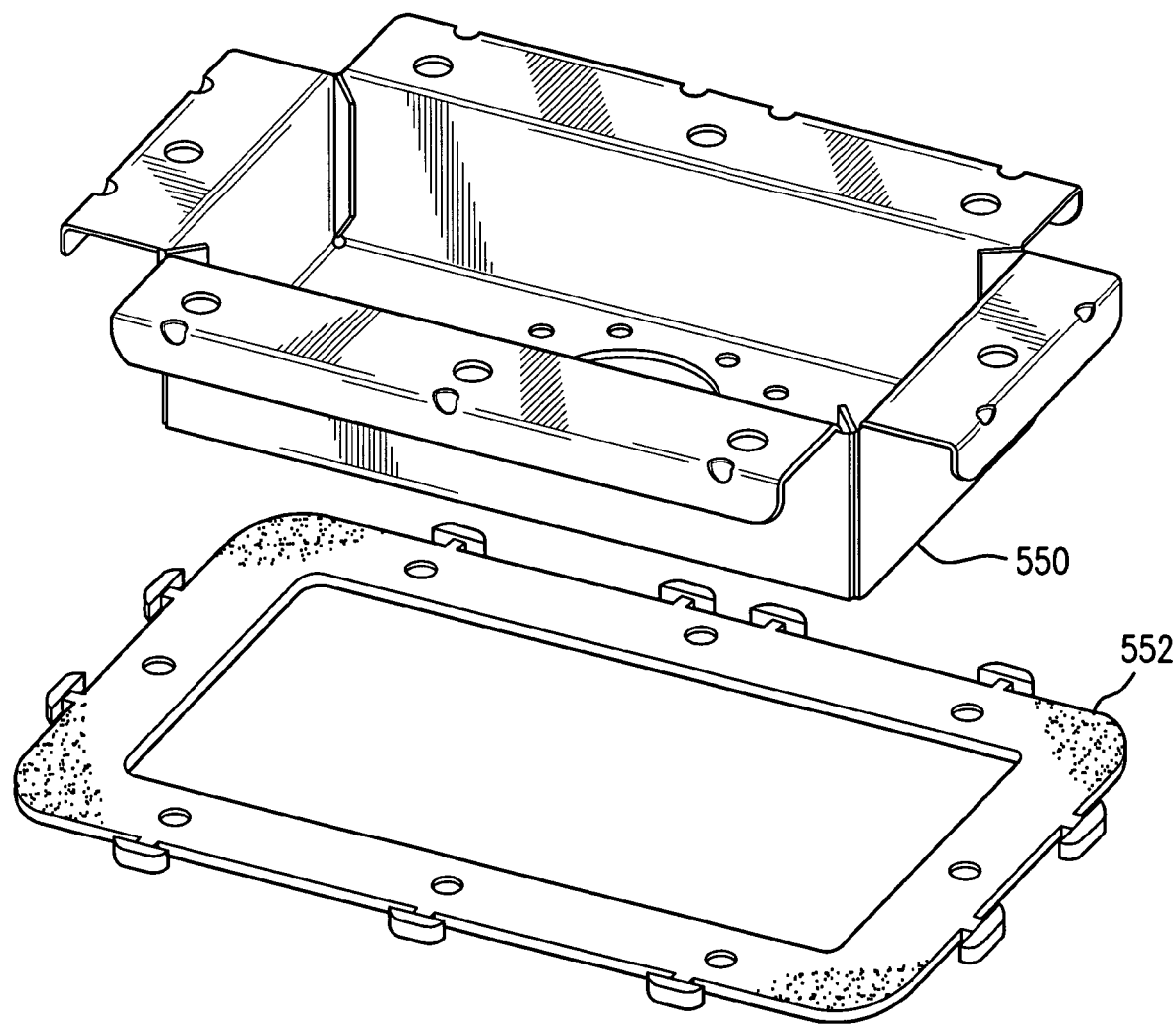
FIG. 23 is an exploded view of the housing section shown in FIG. 22.

FIGS. 22 and 23 illustrate a similar configuration to that shown in FIGS. 20 and 21, differing in the configuration or shape of the collar. In the embodiment of FIGS. 22 and 23, the chute assembly 550 is secured to a collar 552 having a planar configuration, as compared to the "L-shaped" configuration shown in FIGS. 20 and 21 or the "C-shaped" configuration discussed above. As FIGS. 20-23 demonstrate, various and alternative configurations of the collar of the invention are available for the different embodiments of the invention depending on need. The configurations specifically shown herein are provided for illustration of various and alternative means for securing a chute assembly to a collar, and the invention is not intended to be limited to the particular illustrated embodiments.

Figure 24:
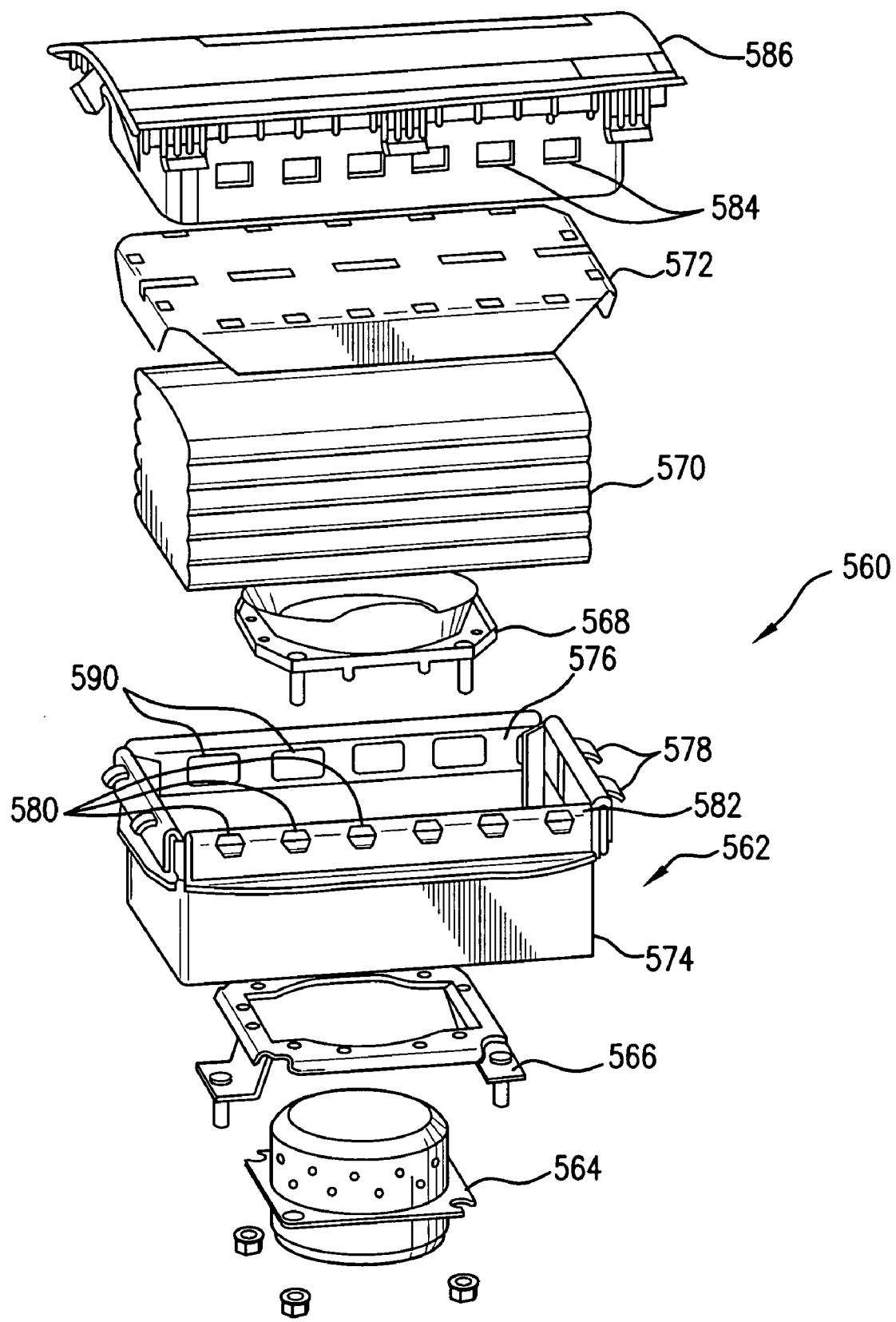
FIG. 24 is an exploded view of an airbag module of another embodiment of this invention.

FIG. 24 shows an exploded view of an airbag module 560, similar to that described above in FIG. 3. The airbag module 560 includes a housing 562, and an inflator device 564 disposed partially beneath the housing 562. A mounting bracket 566 is used to connect the inflator device 564 to a vehicle (not shown). A retainer deflector 568 secures the housing 562 to the mounting bracket 566 and the inflator device 564. The retainer deflector 568 is disposed within the housing 562 and an inflatable cushion 570. The inflatable cushion 570 is disposed, at least partially, within the housing 562 when the inflatable cushion 570 is in the compacted configuration prior to inflation. An optional cover 572 can be disposed over the housing 562 to keep debris, such as dust, from entering the housing 562 and contacting the inflatable cushion 570.

The housing 562 includes a chute assembly 574 secured to a collar 576 by a plurality of hooks 578 that are generally spaced apart and aligned at a top edge of the collar 576. The chute assembly 574 includes a plurality of openings 580 that are generally spaced apart and aligned near a fold 582. At least one, and desirably each, of the plurality of openings 580 is generally disposed over a corresponding one of the plurality of hooks 578 to secure the chute assembly to the collar 576.

In addition to securing the chute assembly 574 to the collar 576, the plurality of hooks 578 also are, or act as, attachment hooks for attaching the collar 576, and thus the housing 562, to the vehicle, such as described above in the embodiment shown in FIG. 5. Each of the plurality of hooks 578 also fit through a corresponding one of a plurality of panel openings 584 in an instrument panel door 586 to connect the housing 562 to the instrument panel of the vehicle. As will be appreciated, various and alternative sizes, shapes, positions and configurations are available for the parts and elements illustrated in FIG. 24. For example, the instrument panel can be formed without a separate and/or discrete door element, and the hooks can be attached directly to the instrument panel. Also, the collar 576 shown in FIG. 24 includes a plurality of holes 590 for reducing the material and weight of the collar 576.

Figure 25:
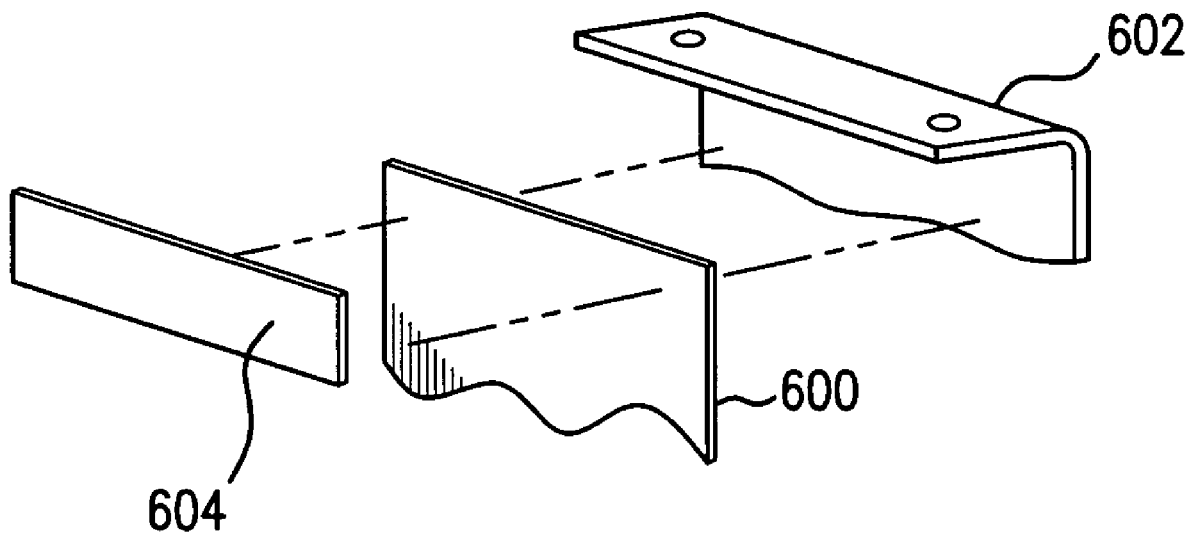
FIG. 25 is an exploded sectional view of another embodiment of a housing of the invention.

In yet another embodiment of the invention, the chute assembly is mechanically secured to the collar. As used herein, "mechanically secured" refers to a connection formed by or using a machine and/or a tool. FIG. 25 illustrates an exploded view of a chute assembly 600 mechanically secured to a collar 602 according to one embodiment of the invention. The chute assembly 600 is secured or sandwiched between the collar 602 and a backer plate 604. The backer plate 604 is joined to the collar 602 by various and alternative means known and available to those skilled in the art, such as, for example, TOX joining, lancing, interlocking T-slots, bolts, rivets, screws, and combinations thereof.

Figure 26:
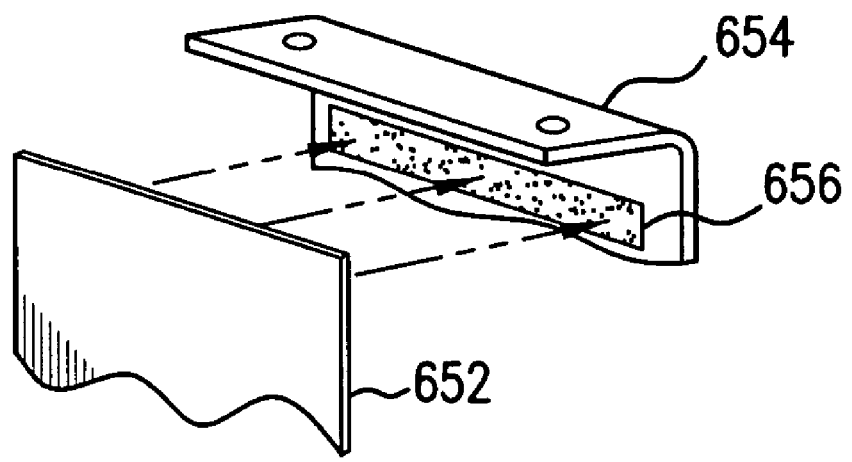
FIG. 26 is an exploded sectional view of still yet another embodiment of a housing of the invention.

FIG. 26 illustrates an exploded partial sectional view of a housing 650 according to still yet another embodiment of this invention. In the embodiment of FIG. 26, a chute assembly 652 is bonded to a collar 654 by an adhesive material 656. The adhesive material 656 can be any suitable adhesive material known or available to those skilled in the art. Examples of other means for bonding the chute assembly to the collar include without limitation ultrasonic welding, insert molding, or combinations thereof.

Thus, the invention provides an improved airbag module housing, as compared to the traditional stamped metal housings. The flexible material of the housing generally reduces both cost and weight over the stamped metal housings typically used for airbag modules. Furthermore, the collapsibility of the flexible housing provides better shipping efficiency of the rigid metal housing currently used.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A housing for an airbag module that contains an inflatable cushion in a compacted configuration, the inflatable cushion inflated by inflation gas supplied by an inflator device, the housing comprising:
    a collar for attaching the housing to a vehicle; and
    a chute assembly formed of a flexible material and secured to the collar;
    a pin for securing the chute assembly to the collar; and
    at least one loop disposed at an edge of each of the chute assembly and the collar, wherein the pin extends through the at least one loop of each of the chute assembly and the collar to secure the chute assembly to the collar.

2. The housing of claim 1 wherein the flexible material comprises a material selected from a group consisting of a woven fabric, a nonwoven fabric, molded plastic, a plastic film, and combinations thereof.

3. An airbag module for protecting an occupant of a vehicle from an impact, the airbag module comprising:
    the housing of claim 1;
    an inflatable cushion in a compacted configuration contained in the housing; and
    an inflator device in inflation combination with the inflatable cushion, wherein upon receipt of an activation signal, the inflator device supplies inflation gas to inflate the inflatable cushion.

4. The airbag module of claim 3 wherein the inflator device is disposed adjacent to an outer side of the housing and includes a first portion extending through an inflator opening in the housing and a second portion that is disposed outside of the housing and connected to the vehicle.

5. The airbag module of claim 4, further comprising a retainer deflector disposed in the housing and connected to the inflator device, wherein a bottom side wall of the chute assembly includes the inflator opening, and a portion of the bottom side wall is disposed between the retainer deflector and the inflator device to secure the chute assembly to the inflator device.

6. The airbag module of claim 4 wherein the portion of the inflator device disposed through the inflator opening in the chute assembly comprises an inflation gas diffuser.

7. A housing for an airbag module that contains an inflatable cushion in a compacted configuration, the inflatable cushion inflated by inflation gas supplied by an inflator device, the housing comprising:
    a collar for attaching the housing to a vehicle, the collar including a vehicle attachment flange for attaching the collar to the vehicle and a side portion extending at an angle from the vehicle attachment flange;
    a chute assembly formed of a flexible material and secured to the collar; and
    a pin for securing the chute assembly to the collar, wherein one of the side portion of the collar or the chute assembly comprises a plurality of lanced sections and an other of the side portion of the collar or the chute assembly comprises a plurality of openings, wherein at least one of the plurality of lanced sections is disposed through a corresponding one of the openings and the pin extends through the first of the plurality of lanced sections to secure the chute assembly to the collar.

8. An airbag module comprising the housing of claim 7, and further comprising:
    an inflatable cushion in a compacted configuration contained in the housing;
    an inflator device in inflation combination with the inflatable cushion, wherein upon receipt of an activation signal, the inflator device supplies inflation gas to inflate the inflatable cushion, the inflator device disposed adjacent to an outer side of the housing and including a first portion extending through an inflator opening in the housing and a second portion that is disposed outside of the housing and connected to the vehicle.

9. The airbag module of claim 8, further comprising a retainer deflector disposed in the housing and connected to the inflator device, wherein a bottom side wall of the chute assembly includes the inflator opening, and a portion of the bottom side wall is disposed between the retainer deflector and the inflator device to secure the chute assembly to the inflator device.

10. The airbag module of claim 8, wherein the portion of the inflator device disposed through the inflator opening in the chute assembly comprises an inflation gas diffuser.

11. A housing for an airbag module that contains an inflatable cushion in a compacted configuration, the inflatable cushion inflated by inflation gas supplied by an inflator device, the housing comprising:

a collar for attaching the housing to a vehicle, the collar including a vehicle attachment flange for attaching the collar to the vehicle, and a plurality of hooks; and a chute assembly formed of a flexible material, wherein the chute assembly includes an attachment portion that extends over a portion of the vehicle attachment flange and is secured to the collar by the plurality of hooks.

12. The housing of claim 11 wherein the chute assembly comprises a plurality of openings and at least one of the plurality of openings is disposed over a corresponding one of the plurality of hooks.

13. The housing of claim 11 wherein at least one of the plurality of hooks is stamped and bent from the collar.

14. The housing of claim 11 wherein at least one of the plurality of hooks comprises an attachment arm.

15. The housing of claim 11 wherein the plurality of hooks comprise a plurality of attachment hooks for attaching the collar to the vehicle.

16. The housing of claim 11 wherein the chute assembly comprises a bottom side wall having an inflator opening for receiving an inflation gas diffuser connected to the inflator device.

17. An airbag module comprising the housing of claim 11, and further comprising:

an inflatable cushion in a compacted configuration contained in the housing;

an inflator device in inflation combination with the inflatable cushion, wherein upon receipt of an activation signal, the inflator device supplies inflation gas to inflate the inflatable cushion, the inflator device disposed adjacent to an outer side of the housing and including a first portion extending through an inflator opening in the housing and a second portion that is disposed outside of the housing and connected to the vehicle.

18. The airbag module of claim 17, further comprising a retainer deflector disposed in the housing and connected to the inflator device, wherein a bottom side wall of the chute assembly includes the inflator opening, and a portion of the bottom side wall is disposed between the retainer deflector and the inflator device to secure the chute assembly to the inflator device.

19. The airbag module of claim 17 wherein the portion of the inflator device disposed through the inflator opening in the chute assembly comprises an inflation gas diffuser.

20. The airbag module of claim 17, further comprising a mounting bracket for connecting the second portion of the inflator device to the vehicle.

* * * * *